United States Patent
Wang et al.

(10) Patent No.: US 12,537,746 B2
(45) Date of Patent: Jan. 27, 2026

(54) DEVICE USING NEURAL NETWORK FOR COMBINING CELLULAR COMMUNICATION WITH SENSOR DATA

(71) Applicant: GOOGLE LLC, Mountain View, CA (US)

(72) Inventors: Jibing Wang, San Jose, CA (US); Erik Richard Stauffer, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 297 days.

(21) Appl. No.: 18/279,984

(22) PCT Filed: Mar. 1, 2022

(86) PCT No.: PCT/US2022/018258
§ 371 (c)(1),
(2) Date: Sep. 1, 2023

(87) PCT Pub. No.: WO2022/187191
PCT Pub. Date: Sep. 9, 2022

(65) Prior Publication Data
US 2024/0146620 A1    May 2, 2024

Related U.S. Application Data

(60) Provisional application No. 63/155,096, filed on Mar. 1, 2021.

(51) Int. Cl.
*H04W 72/51*    (2023.01)
*H04L 41/16*    (2022.01)
(Continued)

(52) U.S. Cl.
CPC ....... *H04L 41/16* (2013.01); *H04W 36/00837* (2018.08); *H04W 72/51* (2023.01); *H04W 36/326* (2023.05)

(58) Field of Classification Search
CPC ..................................................... H04L 41/16
See application file for complete search history.

(56) References Cited

U.S. PATENT DOCUMENTS 10,256,872 B2    4/2019   Jiang et al.
10,523,281 B2    12/2019  John Wilson et al.
(Continued)

FOREIGN PATENT DOCUMENTS

EP    2688311 A2    1/2014
EP    3418948 A1    12/2018
(Continued)

OTHER PUBLICATIONS

International Search Report and Written Opinion mailed Sep. 21, 2022 for corresponding International Application No. PCT/US2022/018258, 25 pages.
(Continued)

*Primary Examiner* — Pamit Kaur

(57) ABSTRACT

A method includes receiving an information block as an input to a transmitter neural network, receiving, as an input to the transmitter neural network, sensor data from one or more sensors, processing the information block and sensor data at the transmitter neural network to generate an output, and controlling an RF transceiver based on the output to generate an RF signal (134) for wireless transmission. Another method includes receiving a first output from an RF transceiver as a first input to a receiver neural network, receiving, as a second input to the receiver neural network, a set of sensor data from one or more sensors, processing the first input and the second input at the receiver neural network to generate an output, and processing the output to generate an information block representative of information communicated by a data sending device.

20 Claims, 8 Drawing Sheets

(51) Int. Cl.
*H04W 36/00* (2009.01)
*H04W 36/32* (2009.01)

(56) References Cited

U.S. PATENT DOCUMENTS

| | | |
|---|---|---|
| 10,785,681 B1 | 9/2020 | Ge et al. |
| 2017/0359106 A1 | 12/2017 | John Wilson et al. |
| 2018/0023956 A1 | 1/2018 | Chen |
| 2018/0191422 A1 | 7/2018 | Xia et al. |
| 2018/0270022 A1 | 9/2018 | Sun et al. |
| 2019/0065951 A1 | 2/2019 | Luo et al. |
| 2019/0171937 A1 | 6/2019 | Lin et al. |
| 2020/0077285 A1 | 3/2020 | Yu et al. |
| 2020/0210887 A1* | 7/2020 | Jain .................. G01S 7/4972 |
| 2020/0275402 A1 | 8/2020 | Shi et al. |
| 2020/0366385 A1 | 11/2020 | Ge et al. |
| 2020/0404644 A1 | 12/2020 | Zhu et al. |
| 2021/0075691 A1 | 3/2021 | Zeng et al. |
| 2022/0086057 A1 | 3/2022 | Pezeshki et al. |
| 2022/0353012 A1 | 11/2022 | Honkala et al. |

FOREIGN PATENT DOCUMENTS

| | | |
|---|---|---|
| KR | 20200016943 A | 2/2020 |
| WO | 2012097003 A3 | 7/2012 |
| WO | 2014037687 A1 | 3/2014 |
| WO | 2020043284 A1 | 3/2020 |
| WO | 2020143902 A1 | 7/2020 |
| WO | 2020171803 A1 | 8/2020 |
| WO | 2021029889 A1 | 2/2021 |
| WO | 2022026397 A1 | 2/2022 |

OTHER PUBLICATIONS

Editors, "Draft new Supplement 55 to ITU-T Y.3170-series (former ITU-T Y.ML-IMT2020-Use-Cases): 'Machine learning in future networks including IMT-2020: use cases'—for approval", International Telecommunication Union: Telecommunication Standardization Sector: SG 13-TD224/PLEN Study Group 13, Oct. 14-25, 2019, 60 pages.
Jia, Chenglu et al., "Machine Learning Empowered Beam Management for Intelligent Reflecting Surface Assisted Mmwave Networks", arXiv:2003.01306v1 [eess.SP], Mar. 3, 2020, 8 pages.
Strodthoff, N. et al., "Enhanced Machine Learning Techniques for Early HARQ Feedback Prediction in 5G", IEEE Journal on Selected Areas in Communications; vol. 37, Issue 11; Nov. 1, 2019, pp. 2573-2587.
Vakil, A. et al., "Feature Level Sensor Fusion for Passive RF and EO Information Integration", IEEE 2020 Aerospace Conference; Mar. 7-14, 2020; 9 pages.
International Preliminary Report on Patentability mailed Sep. 14, 2023 for PCT Application No. PCT/US2022/018258, 18 pages.
Non-Final Office Action mailed May 2, 2025 for U.S. Appl. No. 18/016,502, 41 pages.

\* cited by examiner

DEVICE USING NEURAL NETWORK FOR COMBINING CELLULAR COMMUNICATION WITH SENSOR DATA

CROSS-REFERENCE TO RELATED APPLICATIONS

The present application is a U.S. National Stage under 35 U.S.C. § 371 of International Patent Application Serial No. PCT/US2022/018258, entitled "DEVICE USING NEURAL NETWORK FOR COMBINING CELLULAR COMMUNICATION WITH SENSOR DATA" and filed on Mar. 1, 2022, which claims priority to U.S. Provisional Application No. 63/155,096, entitled "DEVICE USING NEURAL NETWORK FOR COMBINING CELLULAR COMMUNICATION WITH SENSOR DATA" and filed on Mar. 1, 2021, the entireties of which are incorporated by reference herein.

BACKGROUND

Radio frequency (RF) signaling between a base station (BS) and user equipment (UE) in a cellular network increasingly relies on the use of extremely high frequency carrier bands (e.g., 6, 60, 100 gigahertz (GHz) or more). At such frequencies, RF signaling is particularly susceptible to transmission errors resulting from, for example, multipath fading, atmospheric absorption, bodily absorption, diffraction, or interference. The ability for effective RF signaling at these frequencies thus depends at least in part on the degree to which the propagation path between the UE and the BS is line-of-sight (LOS) or non-line-of-sight (NLOS). This LOS/NLOS aspect of the propagation path between the UE and the BS may help determine situations with acceptable attenuation for extremely-high-frequency signaling.

SUMMARY OF EMBODIMENTS

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method. The computer-implemented method also includes receiving a first information block as an input to a transmitter neural network of the data sending device; receiving, as an input to the transmitter neural network, a first set of sensor data from a first set of one or more sensors of the data sending device; processing the first information block and the first set of sensor data at the transmitter neural network to generate a first output; and controlling a radio frequency (RF) transceiver of the data sending device based on the first output to generate a first RF signal for wireless transmission to a data receiving device. Other embodiments of this aspect include corresponding computer systems, apparatus, and computer programs recorded on one or more computer storage devices, each configured to perform the actions of the methods.

Implementations may include one or more of the following features. The method may include: identifying a neural network architectural configuration to be implemented by the data sending device based on sensor capabilities of the data sending device; and implementing the neural network architectural configuration for the transmitter neural network. The method may include: participating in joint training of the neural network architectural configuration for the transmitter neural network with a neural network architectural configuration for a receiver neural network of the data receiving device. The method may include: receiving, from the data receiving device, a representation of a sensor configuration identifying the first set of one or more sensors from a plurality of sensors of the data sending device; and selectively activating the first set of one or more sensors based on the sensor configuration. The method may include: receiving, from the data receiving device, a representation of time resources or frequency resources to be utilized by a sensor of the first set of one or more sensors that operates in a licensed frequency spectrum. The method may include: transmitting to the data receiving device a representation of time resources or frequency resources to be utilized by a sensor of the data receiving device that operates in a licensed frequency spectrum. The method may include: determining that at least one sensor of the first set of one or more sensors is unavailable; implementing a neural network architectural configuration at the transmitter neural network of the data sending device based on sensor capabilities of the data sending device that exclude the at least one sensor that is unavailable; receiving a second information block as an input to the transmitter neural network of the data sending device; receiving, as an input to the transmitter neural network, a second set of sensor data from the first set of one or more sensors of the data sending device; processing the second information block and the second set of sensor data at the transmitter neural network to generate a second output; and controlling an RF transceiver of the data sending device based on the second output to generate a second RF signal for wireless transmission to the data receiving device. The method may include: transmitting an indication of the at least one sensor that is unavailable from the data sending device to the data receiving device. Controlling the RF transceiver of the data sending device based on the first output may include controlling at least one of a scheduling decision or a handover decision for the data receiving device based on the first output. Controlling the RF transceiver of the data sending device based on the first output may include controlling a beam management operation of the RF transceiver based on the first output. The transmitter neural network of the data sending device includes a deep neural network. The first set of one or more sensors includes at least one of: an object-detection sensor, a positioning sensor, an image sensor, a temperature sensor, an orientation sensor, a user interface sensor, and a pose sensor. The user interface sensor may include at least one of a touch sensor, an audio sensor, and a light sensor. The data sending device may include a base station (bs) of a cellular network and the data receiving device may include a user equipment (UE) of the cellular network. A data sending device may include: a plurality of sensors including the first set of one or more sensors; a radio frequency transceiver; at least one processor coupled to the radio frequency transceiver and to the plurality of sensors; and a non-transitory computer-readable medium storing a set of instructions, the set of instructions configured to manipulate the at least one processor to perform the method of any preceding claim. The method may include: participating in joint training of the neural network architectural configuration for the receiver neural network with a neural network architectural configuration for a transmitter neural network of the data sending device. The method may include: receiving, from the data sending device, a representation of a sensor configuration identifying the first set of one or more sensors from a plurality of sensors of the data receiving device; and selectively activating the first set of one or more sensors based on the sensor configuration. The method may include: receiving, from the data sending device, a representation of time resources or frequency resources to be utilized by a sensor of the first set of one or more sensors that operates in a licensed frequency spectrum. The method may include: transmitting to the data sending device a representation of time resources or frequency resources to be utilized by a sensor of the data sending device that operates in a licensed frequency spectrum. The method may include: determining that at least one sensor of the first set of one or more sensors is unavailable; implementing a neural network architectural configuration at the receiver neural network of the data receiving device based on sensor capabilities of the data receiving device that exclude the at least one sensor that is unavailable; receiving a second output from the RF transceiver of the data receiving device as a third input to the receiver neural network; receiving, as a fourth input to the receiver neural network, a second set of sensor data from the first set of one or more sensors of the data receiving device; processing the third input and the fourth input at the receiver neural network to generate a third output; and processing the third output at the data receiving device to generate a second information block representative of information communicated by the data sending device. The method may include: transmitting an indication of the at least one sensor that is unavailable from the data receiving device to the data sending device. The receiver neural network of the data receiving device includes a deep neural network. The first set of one or more sensors includes at least one of: an object-detection sensor, a positioning sensor, an image sensor, a user interface sensor, and a pose sensor. The user interface sensor may include at least one of a touch sensor, an audio sensor, and a light sensor. The data sending device may include a base station (bs) of a cellular network and the data receiving device may include a user equipment (UE) of the cellular network. The data sending device may include a user equipment (UE) of a cellular network and the data receiving device may include a base station (bs) of the cellular network. The data sending device may include a user equipment (UE) of a cellular network and the data receiving device may include a base station (bs) of the cellular network. The method may include: transmitting an indication of sensor capabilities of the data sending device to the data receiving device; receiving, from the data receiving device, a representation of a neural network architectural configuration that is based on the sensor capabilities of the data sending device; and implementing the neural network architectural configuration for the transmitter neural network. The method may include: receiving, from the data receiving device, a representation of sensor capabilities of the data receiving device; determining a neural network architectural configuration to be implemented by a receiver neural network of the data receiving device based on the sensor capabilities of the data receiving device; and transmitting, to the data receiving device, a representation of the neural network architectural configuration. Implementations of the described techniques may include hardware, a method or process, or computer software on a computer-accessible medium.

One general aspect includes a computer-implemented method. The computer-implemented method also includes receiving a first output from a radio frequency (RF) transceiver of the data receiving device as a first input to a receiver neural network of the data receiving device; receiving, as a second input to the receiver neural network, a first set of sensor data from a first set of one or more sensors of the data receiving device; processing the first input and the second input at the receiver neural network to generate a second output; and processing the second output at the data receiving device to generate a first information block representative of information communicated by a data sending device. Other embodiments of this aspect include corresponding computer systems, apparatus, and computer programs recorded on one or more computer storage devices, each configured to perform the actions of the methods.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
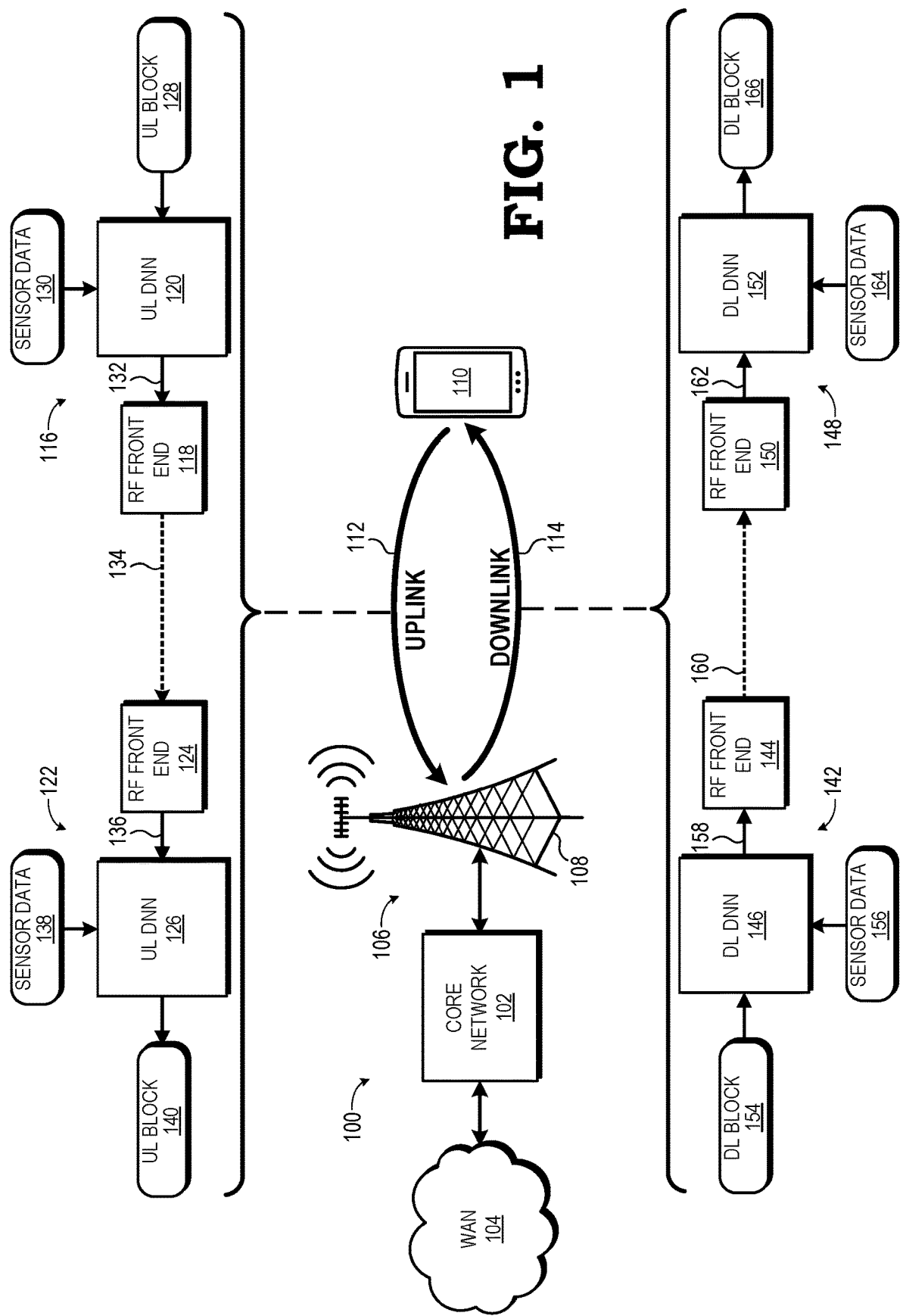
FIG. 1 is a diagram illustrating an example wireless system employing a neural-network-based sensor-and-transceiver fusion scheme in accordance with some embodiments.

Conventional wireless communication systems employ transmitter and receiver processing paths with complex functionality. Typically, each process block in a processing path is designed, tested, and implemented relatively separate from each other. Later, a processing path of blocks is integrated and further tested and adjusted. As described herein, much of the design, test, and implementation efforts for a transmitting processing path or receiving processing path can be avoided through the use of a neural network (also commonly referred to as an artificial neural network) in place of some or all of the individual blocks of a processing path. In this approach, the neural networks on the transmitting processing paths and receiving processing paths of a base station and one or more wirelessly connected UEs can be jointly trained to provide similar functionality as one or more conventional individual processing blocks in the corresponding path. Moreover, these neural networks can be dynamically reconfigured during operation by, for example, modifying coefficients, layer sizes and connections, kernel sizes, and other parameter configurations so as to adapt to changing operating conditions.

This neural network-based approach is particularly suited for the transmitting and receiving process paths of two devices communicating using radio frequency (RF) signaling that is highly dependent on the RF signal propagation environment, such as in cellular networks employing millimeter-wave (mmWave) and Terahertz (THz) RF signaling protocols. In such implementations, the RF signal propagation environment can include the presence, movement, or absence of objects that absorb, scatter, or otherwise interfere with RF signaling at the relevant frequencies, the orientation of the antenna arrays of a transmitting device relative to the objects and a receiving device, the distance between the devices in communication, the presence of other RF interference sources, and the like. Because much of the RF signal propagation environment may be detected or represented in some form in the data generated by sensors, a system may process sets of sensor data from certain sensors to identify relevant parameters of the RF signal propagation environment, and then employ other processes to configure the RF front end of a device to adjust one or more aspects of the RF front end to account for the RF signal propagation environment. For example, conventional systems may employ a beamforming process in which a first device uses a suitable ranging algorithm to determine a second device's relative distance and relative position, and then configures an antenna array to transmit RF signaling in a particular beam direction and at a particular power dictated by a suitable beam management algorithm. However, this approach to beam management is complex to design, test, and implement, and often is not readily adaptable to new categories of operating environments.

As described below with reference to FIGS. 1-9, jointly-trained neural networks operate to fuse sensor data from available sensors of the devices with the digital data operations of the radio transceiver of the devices to improve the RF signaling performances of the devices. In some embodiments, a base station (BS) and a user equipment (UE) each employs a transmitter (TX) processing module and a receiver (RX) processing module, with the TX processing module of the BS in operative communication with the RX processing module of the UE, and the TX processing module of the UE in operative communication with the RX processing module of the BS. Each processing module implements at least one neural network, such as a deep neural network (DNN)(that is, a neural network with at least one hidden layer), and the neural networks of the TX and RX processing modules of the BS and UE are jointly trained using one or more sets of training data so as to provide sensor-and-transceiver fusion functionality in addition to various other transmission/reception functionality, such as coding and decoding, modulation and demodulation, and the like.

As a general overview of this sensor-and-transceiver fusion functionality, in at least one embodiment the TX processing module of the sending device (e.g., the BS for purposes of this overview) receives as input an outgoing information block (that is, a set of information bits, such as a communication block or transport block) and sensor data from one or more sensors of the sending device. The information block includes a digital input provided to the RF transceiver of the sending device that is supplied for pre-processing and analog-to-digital conversion and then RF transmission. From these communication and sensor inputs, the neural network of the TX processing module generates a first output for processing at the RF front end of the sending device for generation of a transmission for wireless communication to the receiving device (e.g., the UE for purposes of this overview). Accordingly, the first output is provided to an RF front end of the sending device, whereupon the RF front end processes and converts the first output to an analog signal (that is, the baseband signal), and then modulates this analog signal with the appropriate carrier frequency to generate a bandpass signal or other RF signal for RF transmission by the sending device to a receiving device.

At the receiving device, the RF front end converts the received RF signal to a digital signal, which is provided as an input to the RX processing module of the receiving device, along with sensor data from one or more sensors of the receiving device. From these inputs, the neural network of the RX processing module generates an output that is representative of the information block transmitted by the sending device. The output then may be processed by one or more components of the receiving device to obtain a representation of the information block for further processing.

Under this approach, the DNNs or other neural networks of the sending device and receiving device operate to, in effect, fuse sensor data with the outgoing/incoming information block so that the processing and transmission/reception of the resulting output adapts to the RF signal propagation environment as detected by the sensors of the sending and receiving devices. As one example, the BS may employ one or more object-detection sensors, such as a radar sensor or lidar sensor, and thus by fusing the radar/lidar sensor data with an outgoing information block, the trained neural network of the TX processing module may adaptively configure the RF front end of the BS to account for any detected objects represented in the radar/lidar sensor data and which represent potential interference for a LOS propagation path. This adaptation can include, for example, adapting the beamforming to be employed by the RF transmitter, adapting the transmit power, determining and implementing certain handoff decisions or scheduling decisions, and the like. Similarly, in this example the UE likewise may employ additional radar/lidar sensors and fuse the data from such sensors with the incoming signal from the BS so as to process the output of the RF front end of the UE to automatically adapt for, or otherwise account for, the presence of UE-detected objects that are potential sources of blockage in the LOS path. As another example, the BS may employ a camera or other imaging sensor, and the sensor data from this imaging sensor may represent that the LOS path between the BS and the UE is blocked by, for example, a building, the user's body, or clothing of the user, and as a result of this sensor data input to the TX processing module of the BS, the TX processing module may adapt a scheduling or handover decision for the UE. As a result of the sensor data representing a blocked LOS path, the BS may instruct the UE to switch to a frequency band, a different antenna configuration, or to a different radio access technology (RAT), that is better suited to handling the blocked LOS path.

To facilitate this process, the BS or another component in the cellular network provides for initial joint training of one or more DNN architectural configurations, each representing corresponding combinations of sensors and other parameters. To illustrate, the BS and UE may jointly train one set of DNN architectural configurations for a first subset of sensors employed by the BS and UE, a second set of DNN architectural configurations for a second subset of sensors, and so forth. To this end, in at least one embodiment the receiving device (e.g., a UE) is configured to transmit its sensor capabilities to the transmitting device (e.g., a BS) so that the transmitting device may tailor either or both of the joint DNN training and DNN employment for the receiving device. Further, as the receiving device operates using an implemented DNN architectural configuration, the receiving device can periodically (or in response to another trigger) send the current gradients implemented in its DNN(s) so that the transmitting device can utilize these gradients for online updating of the joint sensor/transceiver DNNs on both the transmitting side and the receiving side. Although the extended example given above describes a BS transmitting device and a UE receiving device (e.g., a cellular downlink), this approach may be used with a UE transmitting device and a BS receiving device (e.g., a cellular uplink), peer-to-peer communications (e.g., cellular sidelink), and other network topologies.

FIG. 1 illustrates downlink (DL) and uplink (UL) operations of an example wireless communications network 100 employing a neural network-based sensor-and-transceiver fusion scheme in accordance with some embodiments. As depicted, the wireless communication network 100 is a cellular network including a core network 102 coupled to one or more wide area networks (WANs) 104 or other packet data networks (PDNs), such as the Internet. Each BS 108 supports wirelessly communication with one or more UEs, such as UE 110, via radio frequency (RF) signaling using one or more applicable RATs as specified by one or more communications protocols or standards. As such, the BS 108 operates as the wireless interface between the UE 110 and various networks and services provided by the core network 102 and other networks, such as packet-switched (PS) data services, circuit-switched (CS) services, and the like. Conventionally, communication of signaling from the BS 108 to the UE 110 is referred to as "downlink" or "DL" whereas communication of signaling from the UE 110 to the BS 108 is referred to as "uplink" or "UL."

The BS 108 can employ any of a variety of RATs, such as operating as a NodeB (or base transceiver station (BTS)) for a Universal Mobile Telecommunications System (UMTS) RAT (also known as "3G"), operating as an enhanced NodeB (eNodeB) for a Third Generation Partnership Project (3GPP) Long Term Evolution (LTE) RAT, operating as a 5G node B ("gNB") for a 3GPP Fifth Generation (5G) New Radio (NR) RAT, and the like. The UE 110, in turn, can implement any of a variety of electronic devices operable to communicate with the BS 108 via a suitable RAT, including, for example, a mobile cellular phone, a cellular-enabled tablet computer or laptop computer, a desktop computer, a cellular-enabled video game system, a server, a cellular-enabled appliance, a cellular-enabled automotive communications system, a cellular-enabled smartwatch or other wearable device, and the like.

Communication of information over an air interface formed between the BS 108 and the UE 110 takes the form of RF signals that represent both control plane signaling and user data plane signaling. However, due to the relatively high frequencies and relatively tight timing margins typically employed, the RF signaling is susceptible to attenuation and interference, particularly in the presence of bodies, buildings, and other objects that interfere with LOS propagation paths. Conditions that have the potential to impair RF signaling between the BS 108 and the UE 110 (as well as the absence of such conditions) may be detectable from, or otherwise represented in, the sets of current sensor data generated by sensors of one or both of the BS 108 and the UE 110. For example, object-detecting sensors, such as radar, lidar, or imagers (e.g., imaging cameras), may generate sensor data that reflects the presence or absence of interfering objects in a LOS propagation path between the BS 108 and the UE 110. Similarly, positioning data, such as from a Global Positioning System (GPS) sensor or a camera-based visual odometry sensor system, locates one the position and/or motion of the BS 108 or UE 110 relative to the other, and thus may represent the current RF signal propagation environment. As another example, a light sensor, image sensor, or touch sensor may provide sensor data indicating the pose of the UE 110 relative to the user's body, and thus serve as an indication of the likely current RF signal propagation environment for the UE 110.

Accordingly, in some embodiments both the BS 108 and the UE 110 implement transmitter (TX) and receiver (RX) processing paths that integrate one or more neural networks (NNs) that are trained or otherwise configured to use sensor data from a set of one or more sensors local to the corresponding component along with input information in the form of an outgoing information block (at the TX processing path) or an incoming RF signal (at the RX processing path) to generate a resulting output that is either provided for RF transmission to the data receiving device (when the processing is being performed by the TX processing path) or which is further processed as a representation of an incoming information block (when the processing is being performed by the RX processing path). Under this approach, the fusion of the input sensor data with the input information intended for processing by an RF transceiver (that is, by the RF front end) by the one or more neural networks allows the one or more neural networks to account for the current RF signal propagation environment in which the corresponding RF signal is to be transmitted or received, and thus provides for improved TX or RX performance.

To illustrate, between the BS 108 and UE 110 there is both an uplink (UL) transmission path 112 for RF transmissions from the UE 110 to the BS 108 and a downlink (DL) transmission path 114 for RF transmissions from the BS 108 to the UE 110. Either or both of these transmission paths 112, 114 may employ the neural-network-based sensor-and-transceiver fusion scheme described herein. As such, in the context of the UL transmission path 112, the UE 110 serves as the data sending device and the BS 108 serves as the data receiving device, whereas in the context of the DL transmission path 114, the BS 108 serves as the data sending device and the UE 110 serves as the data receiving device.

For the UL transmission path 112, the UE 110 employs a UL TX processing path 116 having an RF front end 118 and a UL DNN 120 (or other neural network) having an output coupled to an input of the RF front end 118. The RF front end 118 includes one or more antenna arrays, one or more modems configured for the corresponding RAT(s) employed (e.g., Third Generation Partnership Project (3GPP) Fifth Generation New Radio (5G NR)), one or more analog-to-digital converters (ADCs), one or more digital-to-analog converters (DACs), and the like. The UL DNN 120 performs functions traditionally performed by a baseband transmit processor including digital signal processing as well as additional functions. Inversely, for the UL transmission path 112, the BS 108 employs a UL RX processing path 122 having an RF front end 124 and a UL DNN 126 (or other neural network) having an input coupled to an output of the RF front end 124. As with the RF front end 118, the RF front end 124 includes one or more antenna arrays, one or more modems, one or more ADCs, one or more DACs, and the like. Meanwhile the UL DNN 126 performs functions traditionally performed by a baseband receive processor including digital signal processing as well as additional functions.

In operation, an outgoing uplink information block 128 (identified herein as "outgoing UL block 128" representing a set of information bits to be transmitted is provided by a CPU or other processor (not shown) or other component of the UE 110 to an input of the UL DNN 120. Concurrently, a set of current sensor data 130 from a set of one or more sensors (see FIG. 2) of the UE 110 is provided as an input to the UL DNN 120. The UL DNN 120, being trained individually or jointly with the UL DNN 126 of the BS 108, implements one or more DNNs or other neural networks to process these two inputs to generate a corresponding output 132, which is provided to a corresponding input of the RF front end 118. In at least one embodiment, the output 132 includes a sequence or other set of digital bits that represent information to be used by the RF front end 118 to generate one or more corresponding RF signals 134 for transmission to the BS 108. This information can include a representation of the information present in the outgoing UL block 128, control information for controlling some aspect of the RF front end 118, such as for controlling a beamforming operation, a scheduling/handover process, or a resource allocation scheme, and the like. To illustrate, the sensor data 130 may reflect the presence of one or more interfering objects in the LOS path between the UE 110 and the BS 108, and thus the UL DNN 120, as a result of prior training or configuration, when processing the sensor data 130 along with the information of the outgoing UL block 128, generates the output 132 to include control information that causes the RF front end 118 to utilize beam management to form a transmission beam that employs a reflective, or NLOS, propagation path for the one or more RF signals 134 transmitted between the UE 110 and the BS 108. The processing that the UL DNN 120 is trained or otherwise configured to do further can include, for example, modulation of an initial analog signal representative of the information of the outgoing UL block 128, encoding of the resulting modulated signal, and other processes to prepare the resulting output 132 for RF conversion by the RF front end 118.

At the BS 108, the RF front end 124 receives the one or more RF signals 134 and pre-processes the one or more RF signals 134 to generate an input 136 that is provided to the UL DNN 126 of the UL RX path 122. This pre-processing can include, for example, power amplification, conversion of band-pass signaling to baseband signaling, initial analog-to-digital conversion, and the like. Concurrently, a set of current sensor data 138 from a set of one or more sensors of the BS 108 (or available to the BS 108) is input to the UL DNN 126. The UL DNN 126, being trained individually or jointly with the UL DNN 120 of the UE 110, implements one or more DNNs or other neural networks to process these two inputs to generate a corresponding output in the form of an incoming uplink information block 140 (referred to herein as "incoming UL block 140"), which includes a sequence or other set of bits that represents a reconstruction of the information reflected in the outgoing UL block 128. That is, the UL DNN 126 utilizes a representation of the uplink RF propagation environment as represented in the sensor data 138 to guide its processing of the input 136 to generate the incoming UL block 140. For example, sensor data from radar or lidar may reflect the presence of one or more obstacles in a LOS path between the BS 108 and the UE 110, and thus, in effect, cause the UL DNN 126 to process the input 136 under an assumption that the one or more RF signals 134 that were the basis of the input 136 were transmitted by the UE 110 to the BS 108 via an NLOS propagation path. The incoming UL block 140 then may be provided to a CPU or other processor or other component of the BS 108 for further processing or transmission upstream. Further, in some embodiments, the output provided by the UL DNN 126 can include feedback control signaling for the RF front end 124 for processing the incoming one or more RF signals 134. For example, the sensor data 138 may reflect the presence of a tree in the beam path being used for the RF signal 134, and thus the UL DNN 126 may be trained to use this information to generate a control signal that directs the RF front end 124 to increase its receiver sensitivity, activate additional antenna arrays, or the like, to compensate for the attenuation presented by the obstruction.

Downlink transmissions are handled in a similar manner, but with the BS 108 as the data-sending device and the UE 110 as the data-receiving device. The BS 108 employs a DL TX processing path 142 having an RF front end 144 and a DL DNN 146 (or other neural network) having an output coupled to an input of the RF front end 144. In turn, the UE 110 employs a DL RX processing path 148 having an RF front end 150 and a DL DNN 152 (or other neural network) having an input coupled to an output of the RF front end 150. Note that the RF front end 144 and the RF front end 124 of the BS 108 may be the same RF front end or different RF front ends, and that the RF front end 118 and the RF front end 150 of the UE 110 may be the same RF front end or different RF front ends.

As with the uplink transmission operation described above, but in the opposite flow direction, an outgoing downlink information block 154 (identified herein as "outgoing DL block 154" represents a set of information bits to be transmitted by a CPU or other processor (not shown) or other component of the BS 108 to an input of the DL DNN 146. Concurrently, current sensor data 156 from a set of one or more sensors (see FIG. 2) of the BS 108 is provided as an input to the DL DNN 146. The DL DNN 146, being trained individually or jointly with the DL DNN 152 of the UE 110, implements one or more DNNs or other neural networks to process these two inputs to generate a corresponding output 158, which is provided to a corresponding input of the RF front end 144. As similarly noted above, the output 158 can include a sequence or other set of digital bits that represent information to be used by the RF front end 144 to generate one or more corresponding RF signals 160 for transmission to the UE 110. This information can include a representation of the information present in the outgoing UL block 128, control information for controlling some aspect of the RF front end 118, such as for controlling a beamforming operation or a resource allocation scheme, and the like.

At the UE 110, the RF front end 150 receives the one or more RF signals 160 and pre-processes the one or more RF signals 160 to generate an input 162 that is provided to the DL DNN 152 of the DL RX path 148. Concurrently, current sensor data 164 from a set of one or more sensors of the UE 110 is input to the DL DNN 152. The DL DNN 152, being trained individually or jointly with the DL DNN 146 of the BS 108, implements one or more DNNs or other neural networks to process these two inputs to generate a corresponding output in the form of an incoming downlink information block 166 (referred to herein as "incoming DL block 166"), which includes a sequence or other set of bits that represents a reconstruction of the information reflected in the outgoing DL block 154. That is, the DL DNN 152 utilizes a representation of the downlink RF propagation environment as represented in the sensor data 164 to guide its processing of the input 162 to generate the incoming DL block 166. As similarly noted with respect to the UL DNN 126, the output provided by the DL DNN 152 further can include feedback control signaling for the RF front end 150 to control some aspect of operation of the RF front end 150 as it receives the one or more RF signals 160, such as changing receiver sensitivity, changing which antenna arrays are active, modifying the beam being employed, etc.

As demonstrated by system 100, rather than implementing TX and RX processing paths as chains of separate and complex functional blocks that require individual design, testing, and implementation efforts, in at least some embodiments, the TX and RX processing paths 116, 122, 142, 148 employ one or more DNNs or other neural networks in place of some or all of these individual blocks, with each DNN or other neural network providing the functionality of at least part of at least one of the traditionally separate blocks of the corresponding processing path. To illustrate, one or more DNNs in a TX processing path can provide the equivalent functionality of an encoding stage and a modulating stage of a conventional TX path. Similarly, the one or more DNNs or other neural networks in an RX processing path can perform, for example, the functions of a demodulating stage and a decoding stage. Moreover, as described above and in greater detail herein, these neural networks can further incorporate sensor data as inputs so that the processing and RF front end control implemented by the neural networks can account for information regarding the current RF signal propagation environment as reflected by the current sensor data. Moreover, as described below, these neural networks can be reconfigured through retraining, which provides more flexibility and adaptability to changes in the RF signal propagation environment relative to the more specific and less flexible components found in conventional implementations.

Figure 2:
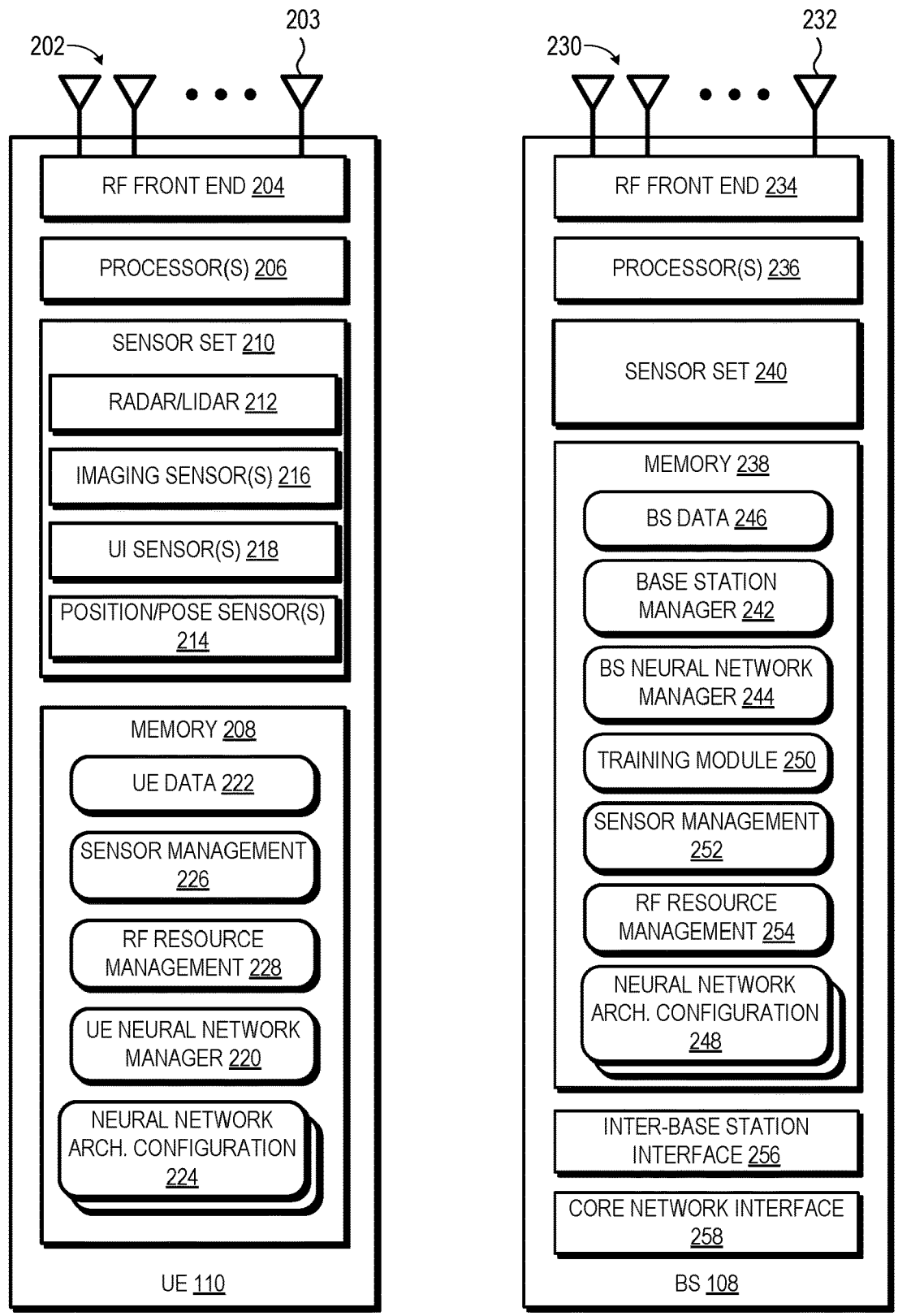
FIG. 2 is a diagram illustrating example configurations of a BS and a UE implementing neural-network-based transmit and receive processing paths in accordance with some embodiments.

FIG. 2 illustrates example hardware configurations for the UE 110 and BS 108 in accordance with some embodiments. Note that the depicted hardware configurations represent the processing components and communication components most directly related to the neural network-based sensor-and-transceiver fusion processes described herein and omit certain components well-understood to be frequently implemented in such electronic devices, such as displays, non-sensor peripherals, power supplies, and the like.

In the depicted configuration, the UE 110 includes one or more antenna arrays 202, with each antenna array 202 having one or more antennas 203, and further includes an RF front end 204 (representing one or both of the RF front ends 118 and 150 of FIG. 1), one or more processors 206, and one or more non-transitory computer-readable media 208. The RF front end 204 operates, in effect, as a physical (PHY) transceiver interface to conduct and process signaling between the one or more processors 206 and the antenna array 202 so as to facilitate various types of wireless communication. The antennas 203 can include an array of multiple antennas that are configured similar to or different from each other and can be tuned to one or more frequency bands associated with a corresponding RAT. The one or more processors 206 can include, for example, one or more central processing units (CPUs), graphics processing units (GPUs), an artificial intelligence (AI) accelerator or other application-specific integrated circuits (ASIC), and the like. To illustrate, the processors 206 can include an application processor (AP) utilized by the UE 110 to execute an operating system and various user-level software applications, as well as one or more processors utilized by modems or a baseband processor of the RF front end 204. The computer-readable media 208 can include any of a variety of media used by electronic devices to store data and/or executable instructions, such as random access memory (RAM), read-only memory (ROM), caches, Flash memory, solid-state drive (SSD) or other mass-storage devices, and the like. For ease of illustration and brevity, the computer-readable media 208 is referred to herein as "memory 208" in view of frequent use of system memory or other memory to store data and instructions for execution by the processor 210, but it will be understood that reference to "memory 208" shall apply equally to other types of storage media unless otherwise noted.

In at least one embodiment, the UE 110 further includes a plurality of sensors, referred to herein as sensor set 210, at least some of which are utilized in the neural-network-based sensor-and-transceiver fusion schemes described herein. Generally, the sensors of sensor set 210 include those sensors that sense some aspect of the environment of the UE 110 or the use of the UE 110 by the user which have the potential to sense a parameter that has at least some impact on, or is a reflection of, an RF propagation path of, or RF transmission/reception performance by, the UE 110 relative to the BS 108. The sensors of sensor set 210 can include one or more sensors 212 for object detection, such as radar sensors, lidar sensors, imaging sensors, structured-light-based depth sensors, and the like. The sensor set 210 also can include one or more sensors 214 for determining a position or pose of the UE 110, such as satellite positioning sensors such as GPS sensors, Global Navigation Satellite System (GNSS) sensors, internal measurement unit (IMU) sensors, visual odometry sensors, gyroscopes, tilt sensors or other inclinometers, ultrawideband (UWB)-based sensors, and the like. Other examples of types of sensors of sensor set 210 can include imaging sensors 216, such as cameras for image capture by a user, cameras for facial detection, cameras for stereoscopy or visual odometry, light sensors for detection of objects in proximity to a feature of the UE 110, and the like. The sensor set 210 further can include user interface (UI) sensors 218, such as touch screens, user-manipulable input/output devices (e.g., "buttons" or keyboards), or other touch/contact sensors, microphones or other voice sensors, thermal sensors (such as for detecting proximity to a user), and the like.

The one or more memories 208 of the UE 110 are used to store one or more sets of executable software instructions and associated data that manipulate the one or more processors 206 and other components of the UE 110 to perform the various functions described herein and attributed to the UE 110. The sets of executable software instructions include, for example, an operating system (OS) and various drivers (not shown), various software applications (not shown), and a UE neural network manager 220 that implements one or more neural networks for the UE 110, such as the neural networks employed in the TX and RX processing paths as described in detail below. The data stored in the one or more memories 208 includes, for example, UE device data 222 and one or more neural network architecture configurations 224. The UE device data 222 represents, for example, user data, multimedia data, beamforming codebooks, software application configuration information, and the like. The UE device data 222 further can include sensor capability information regarding the one or more sensors of the sensor set 210, including the presence or absence of a particular sensor or sensor type, and, for those sensors present, one or more representations of their corresponding capabilities, such as range and resolution for lidar or radar sensors, image resolution and color depth for imaging cameras, and the like.

The one or more neural network architecture configurations 224 include one or more data structures containing data and other information representative of a corresponding architecture and/or parameter configurations used by the UE neural network manager 220 to form a corresponding neural network of the UE 110. The information included in a neural network architectural configuration 224 includes, for example, parameters that specify a fully connected layer neural network architecture, a convolutional layer neural network architecture, a recurrent neural network layer, a number of connected hidden neural network layers, an input layer architecture, an output layer architecture, a number of nodes utilized by the neural network, coefficients (e.g., weights and biases) utilized by the neural network, kernel parameters, a number of filters utilized by the neural network, strides/pooling configurations utilized by the neural network, an activation function of each neural network layer, interconnections between neural network layers, neural network layers to skip, and so forth. Accordingly, the neural network architecture configuration 224 includes any combination of NN formation configuration elements (e.g., architecture and/or parameter configurations) that can be used to create a NN formation configuration (e.g., a combination of one or more NN formation configuration elements) that defines and/or forms a DNN.

In at least one embodiment, the sets of executable software instructions stored in the at least one memory 208 further implement a sensor management module 226 and an RF resource management module 228. The sensor management module 226 is configured to control operation of the sensors of the sensor set 206, including selectively activating or deactivating sensors based on a particular DNN architectural configuration 224 to be employed and configuring certain parameters of activated sensors, such as, for example, range settings suitable for use in the sensor-and-transceiver fusion scheme. Further, in some embodiments, the sensor management module 226 operates to one or both of filter or format sensor data from one or more of the activated sensors of the sensor set 210. For example, a GPS sensor may provide sensor readings at one frequency, but the DNN architectural configuration 224 to be employed may have been trained on GPS sensor data at a lower frequency, in which case the sensor management module 226 may operate to filter the GPS sensor output so that the resulting GPS sensor data is provided at the lower frequency. In some embodiments, one or more of the sensors of the sensor set 210 may require time or frequency resources in a licensed band in order to operate as intended, such as a radar sensor that transmits RF signaling in a licensed frequency. As described below, in some instances the DNNs of the BS 108 may be configured to allocate resources to such sensors at the UE 110, in which case the RF resource management module 228 operates to identify such resource allocations and control the operation of the affected sensors in accordance with the resource allocations identified.

Turning to the hardware configuration of the BS 108, it is noted that although the illustrated diagram represents an implementation of the BS 108 as a single network node (e.g., a 5G NR Node B, or "gNB"), the functionality, and thus the hardware components, of the BS 108 instead may be distributed across multiple network nodes or devices and may be distributed in a manner to perform the functions described herein. As with the UE 110, the BS 108 includes at least one array 230 of one or more antennas 232, an RF front end 234 (representing one or both of the RF front ends 124, 144 of FIG. 1), as well as one or more processors 236 and one or more non-transitory computer-readable storage media 238 (as with the memory 208 of the UE 110, the computer-readable medium 238 is referred to herein as a "memory 238" for brevity). The BS 108 further includes a sensor set 240 having one or more sensors that provide sensor data that may be used for the NN-based sensor-and-transceiver fusion schemes described herein. As with the sensor set 210 of the UE 110, the sensor set 240 of the BS 108 can include, for example, object-detection sensors and imaging sensors, and in instances in which the BS 108 is mobile (such as when implemented in a vehicle or a drone), one or more sensors for detecting position or pose. These components operate in a similar manner as described above with reference to corresponding components of the UE 110.

The one or more memories 238 of the BS 108 store one or more sets of executable software instructions and associated data that manipulate the one or more processors 236 and other components of the BS 108 to perform the various functions described herein and attributed to the BS 108. The sets of executable software instructions include, for example, an operating system (OS) and various drivers (not shown), various software applications (not shown), a BS manager 242, and a BS neural network manager 244. The BS manager 242 configures the RF front end 234 for communication with the UE 110, as well as communication with a core network, such as the core network 102. The BS neural network manager 244 implements one or more neural networks for the BS 108, such as the neural networks employed in the TX and RX processing paths as described herein.

The data stored in the one or more memories 238 of the BS 108 includes, for example, BS data 246 and one or more neural network architecture configurations 248. The BS data 246 represents, for example, network scheduling data, radio resource management data, beamforming codebooks, software application configuration information, and the like. The one or more neural network architecture configurations 248 include one or more data structures containing data and other information representative of a corresponding architecture and/or parameter configurations used by the BS neural network manager 244 to form a corresponding neural network of the BS 108. Similar to the neural network architectural configuration 224 of the UE 110, the information included in a neural network architectural configuration 248 includes, for example, parameters that specify a fully connected layer neural network architecture, a convolutional layer neural network architecture, a recurrent neural network layer, a number of connected hidden neural network layers, an input layer architecture, an output layer architecture, a number of nodes utilized by the neural network, coefficients utilized by the neural network, kernel parameters, a number of filters utilized by the neural network, strides/pooling configurations utilized by the neural network, an activation function of each neural network layer, interconnections between neural network layers, neural network layers to skip, and so forth. Accordingly, the neural network architecture configuration 248 includes any combination of NN formation configuration elements that can be used to create a NN formation configuration that defines and/or forms a DNN or other neural network.

In at least one embodiment, the software stored in the memory 232 further includes one or more of a training module 250, a sensor management module 252, and an RF resource management module 254. The training module 250 operates to train one or more neural networks implemented at the BS 108 or the UE 110 using one or more sets of input data. This training can be performed for various purposes, such as processing communications transmitted over a wireless communication system individually or in combination with current sensor data from the sensors of the local sensor set. The training can include training neural networks while offline (that is, while not actively engaged in processing the communications) and/or online (that is, while actively engaged in processing the communications). Moreover, the training may be individual or separate, such that each neural network is individually trained on its own data set without the result being communicated to, or otherwise influencing, the DNN training at the opposite end of the transmission path, or the training may be joint training, such that the neural networks in the UL processing path are jointly trained on the same, or complementary, data sets, while the neural networks in the DL processing path likewise are jointly trained on the same, or complementary, data sets. As with the sensor management module 226 of the UE 110, the sensor management module 252 of the BS 108 operates to selectively activate or deactivate sensors of the sensor set 240 based on, for example, the particular neural network architectural configuration 248 to be employed by a neural network of the BS 108, control the parameters or other operating characteristics of the activated sensors, filter or otherwise format the sensor data so as to be compatible with the implemented neural network, and the like. The RF resource management module 254 operates to allocate time and frequency resources to sensors of the BS 108, and in some instances to sensors of the UE 110, that operate in a licensed frequency band.

In some embodiments, the BS 108 further includes an inter-base station interface 256, such as an Xn or X2 interface, which the BS manager 242 configures to exchange user-plane, control-plane, and other information between other BSs, and to manage the communication of the BS 108 with the UE 110. The BS 108 further can include a core network interface 258 that the BS manager 242 configures to exchange user-plane, control-plane, and other information with core network functions and/or entities.

Figure 3:
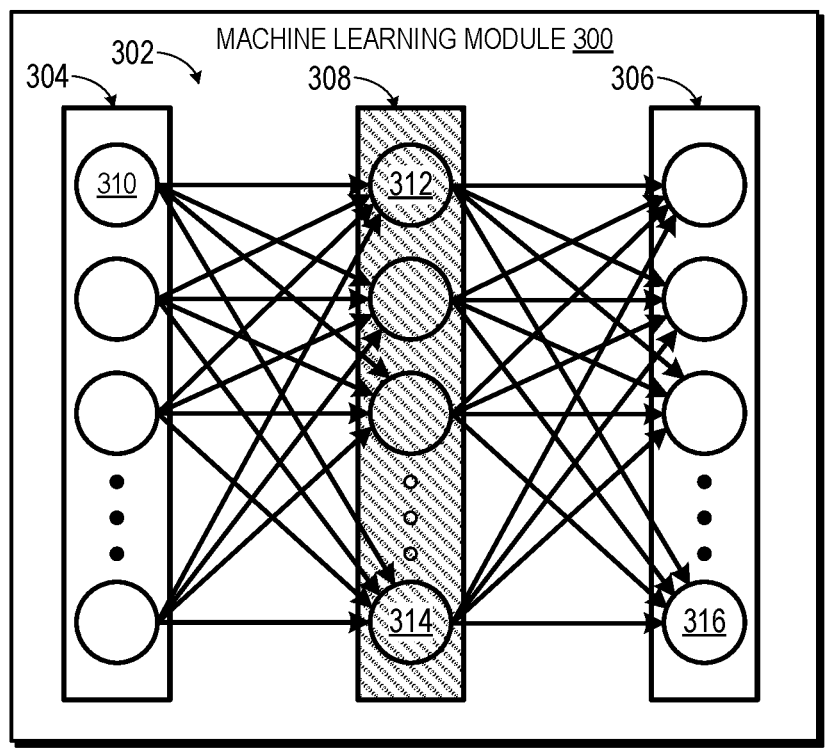
FIG. 3 is a diagram illustrating a machine learning module employing a neural network for use in a neural-network-based sensor-and-transceiver fusion scheme in accordance with some embodiments.

FIG. 3 illustrates an example machine learning (ML) module 300 for implementing a neural network in accordance with some embodiments. As described herein, one or both of the BS 108 and the UE 110 implement one or more DNNs or other neural networks in one or both of the TX processing paths or RX processing paths for processing incoming and outgoing wireless communications. The ML module 300 therefore illustrates an example module for implementing one or more of these neural networks.

In the depicted example, the ML module 300 implements at least one deep neural network (DNN) 302 with groups of connected nodes (e.g., neurons and/or perceptrons) that are organized into three or more layers. The nodes between layers are configurable in a variety of ways, such as a partially-connected configuration where a first subset of nodes in a first layer are connected with a second subset of nodes in a second layer, a fully-connected configuration where each node in a first layer is connected to each node in a second layer, etc. A neuron processes input data to produce a continuous output value, such as any real number between 0 and 1. In some cases, the output value indicates how close the input data is to a desired category. A perceptron performs linear classifications on the input data, such as a binary classification. The nodes, whether neurons or perceptrons, can use a variety of algorithms to generate output information based upon adaptive learning. Using the DNN 302, the ML module 300 performs a variety of different types of analysis, including single linear regression, multiple linear regression, logistic regression, step-wise regression, binary classification, multiclass classification, multivariate adaptive regression splines, locally estimated scatterplot smoothing, and so forth.

In some implementations, the ML module 300 adaptively learns based on supervised learning. In supervised learning, the ML module 300 receives various types of input data as training data. The ML module 300 processes the training data to learn how to map the input to a desired output. As one example, the ML module 300 receives digital samples of a signal as input data and learns how to map the signal samples to binary data that reflects information embedded within the signal. As another example, the ML module 300 receives binary data as input data and learns how to map the binary data to digital samples of a signal with the binary data embedded within the signal. Still further, as another example and as described in greater detail below, the ML module 300 receives sensor data as input data as well as an outgoing information block and learns how to generate an output that includes both a representation of a baseband signal to be converted to one or more RF signals by an RF front end, as well as to control various parameters of the RF front end for transmission of the one or more RF signals (e.g., via beamforming control), or, conversely, receives sensor data as input data as well as an output from an RF front end generated from one or more incoming RF signals and learns how to generate an incoming information block that represents the information of the one or more incoming RF signals using these inputs.

During a training procedure, the ML module 300 uses labeled or known data as an input to the DNN 302. The DNN 302 analyzes the input using the nodes and generates a corresponding output. The ML module 300 compares the corresponding output to truth data and adapts the algorithms implemented by the nodes to improve the accuracy of the output data. Afterward, the DNN 302 applies the adapted algorithms to unlabeled input data to generate corresponding output data. The ML module 300 uses one or both of statistical analyses and adaptive learning to map an input to an output. For instance, the ML module 300 uses characteristics learned from training data to correlate an unknown input to an output that is statistically likely within a threshold range or value. This allows the ML module 300 to receive complex input and identify a corresponding output. Some implementations train the ML module 300 on characteristics of communications transmitted over a wireless communication system (e.g., time/frequency interleaving, time/frequency deinterleaving, convolutional encoding, convolutional decoding, power levels, channel equalization, inter-symbol interference, quadrature amplitude modulation/demodulation, frequency-division multiplexing/demultiplexing, transmission channel characteristics). This allows the trained ML module 300 to receive samples of a signal as an input, such as samples of a downlink signal received at a UE, and recover information from the downlink signal, such as the binary data embedded in the downlink signal.

In the depicted example, the DNN 302 includes an input layer 304, an output layer 306, and one or more hidden layers 308 positioned between the input layer 304 and the output layer 306. Each layer has an arbitrary number of nodes, where the number of nodes between layers can be the same or different. That is, the input layer 304 can have the same number and/or a different number of nodes as output layer 306, the output layer 306 can have the same number and/or a different number of nodes than the one or more hidden layer 308, and so forth.

Node 310 corresponds to one of several nodes included in input layer 304, wherein the nodes perform separate, independent computations. As further described, a node receives input data and processes the input data using one or more algorithms to produce output data. Typically, the algorithms include weights and/or coefficients that change based on adaptive learning. Thus, the weights and/or coefficients reflect information learned by the neural network. Each node can, in some cases, determine whether to pass the processed input data to one or more next nodes. To illustrate, after processing input data, node 310 can determine whether to pass the processed input data to one or both of node 312 and node 314 of hidden layer 308. Alternatively or additionally, node 310 passes the processed input data to nodes based upon a layer connection architecture. This process can repeat throughout multiple layers until the DNN 302 generates an output using the nodes (e.g., node 316) of output layer 306.

A neural network can also employ a variety of architectures that determine what nodes within the neural network are connected, how data is advanced and/or retained in the neural network, what weights and coefficients are used to process the input data, how the data is processed, and so forth. These various factors collectively describe a neural network architecture configuration, such as the neural network architecture configurations 218, 238, and 318 briefly described above. To illustrate, a recurrent neural network, such as a long short-term memory (LSTM) neural network, forms cycles between node connections to retain information from a previous portion of an input data sequence. The recurrent neural network then uses the retained information for a subsequent portion of the input data sequence. As another example, a feed-forward neural network passes information to forward connections without forming cycles to retain information. While described in the context of node connections, it is to be appreciated that a neural network architecture configuration can include a variety of parameter configurations that influence how the DNN 302 or other neural network processes input data.

A neural network architecture configuration of a neural network can be characterized by various architecture and/or parameter configurations. To illustrate, consider an example in which the DNN 302 implements a convolutional neural network (CNN). Generally, a convolutional neural network corresponds to a type of DNN in which the layers process data using convolutional operations to filter the input data. Accordingly, the CNN architecture configuration can be characterized by, for example, pooling parameter(s), kernel parameter(s), weights, and/or layer parameter(s).

A pooling parameter corresponds to a parameter that specifies pooling layers within the convolutional neural network that reduce the dimensions of the input data. To illustrate, a pooling layer can combine the output of nodes at a first layer into a node input at a second layer. Alternatively or additionally, the pooling parameter specifies how and where in the layers of data processing the neural network pools data. A pooling parameter that indicates "max pooling," for instance, configures the neural network to pool by selecting a maximum value from the grouping of data generated by the nodes of a first layer, and use the maximum value as the input into the single node of a second layer. A pooling parameter that indicates "average pooling" configures the neural network to generate an average value from the grouping of data generated by the nodes of the first layer and use the average value as the input to the single node of the second layer.

A kernel parameter indicates a filter size (e.g., a width and a height) to use in processing input data. Alternatively or additionally, the kernel parameter specifies a type of kernel method used in filtering and processing the input data. A support vector machine, for instance, corresponds to a kernel method that uses regression analysis to identify and/or classify data. Other types of kernel methods include Gaussian processes, canonical correlation analysis, spectral clustering methods, and so forth. Accordingly, the kernel parameter can indicate a filter size and/or a type of kernel method to apply in the neural network.

Weight parameters specify weights and biases used by the algorithms within the nodes to classify input data. In some implementations, the weights and biases are learned parameter configurations, such as parameter configurations generated from training data.

A layer parameter specifies layer connections and/or layer types, such as a fully-connected layer type that indicates to connect every node in a first layer (e.g., output layer 306) to every node in a second layer (e.g., hidden layer 308), a partially-connected layer type that indicates which nodes in the first layer to disconnect from the second layer, an activation layer type that indicates which filters and/or layers to activate within the neural network, and so forth. Alternatively or additionally, the layer parameter specifies types of node layers, such as a normalization layer type, a convolutional layer type, a pooling layer type, and the like.

While described in the context of pooling parameters, kernel parameters, weight parameters, and layer parameters, it will be appreciated that other parameter configurations can be used to form a DNN consistent with the guidelines provided herein. Accordingly, a neural network architecture configuration can include any suitable type of configuration parameter that can be applied to a DNN that influences how the DNN processes input data to generate output data.

In some embodiments, the configuration of the ML module 300 is based on a current operating environment. To illustrate, consider an ML module trained to generate binary data from digital samples of a signal. An RF signal propagation environment oftentimes modifies the characteristics of a signal traveling through the physical environment. RF signal propagation environments oftentimes change, which impacts how the environment modifies the signal. A first RF signal propagation environment, for instance, modifies a signal in a first manner, while a second RF signal propagation environment modifies the signal in a different manner than the first. These differences impact the accuracy of the output results generated by the ML module 300. For instance, the DNN 302 configured to process communications transmitted in the first RF signal propagation environment may generate errors or otherwise limit performance when processing communications transmitted in the second RF signal propagation environment. Certain sensors of the sensor set of the component implementing the DNN 302 may provide sensor data that represents one or more aspects of the current RF signal propagation environment. Examples noted above can include lidar, radar, or other object-detecting sensors to determine the presence or absence of interfering objects within a LOS propagation path, UI sensors to determine the presence and/or position of a user's body relative to the component, and the like. However, it will be appreciated that the particular sensor capabilities available may depend on the particular UE 110 or the particular BS 108. For example, one BS 108 may have lidar or radar capability, and thus the ability to detect objects in proximity, while another BS 108 may lack lidar and radar capabilities. As another example, a smartwatch (one embodiment of the UE 110) may have a light sensor that may be used to sense whether the smartwatch is covered by a user's sleeve or other garment, while a cellular phone (another embodiment of the UE 110) may lack this capability. As such, in some embodiments, the particular configuration implemented for the ML module 300 may depend at least in part on the particular sensor configuration of the device implementing the ML module 300.

Accordingly, in some embodiments, the device implementing the ML module 300 generates and stores different neural network architecture configurations for different RF signal propagation environments or configurations, including for different active sensor configurations. For example, the device may have one or more neural network architectural configurations for use when an imaging camera is available for use at the device, and a different set of one or more neural network architectural configurations for use when the imaging camera is unavailable. To illustrate, when the sensor configuration that is providing sensor data to the ML module 300 includes the imaging camera, the ML module 300 may employ a CNN configuration as CNNs generally are particularly well suited for computer vision applications, and employ a non-CNN configuration when an imaging camera is not included in the sensor configuration.

To this end, one or both of the BS 108 or the core network 102 can train the ML module 300 using any combination of the UE neural network manager 220, BS neural network manager 244, and training module 250. The training can occur offline when no active communication exchanges are occurring, or online during active communication exchanges. For example, the BS 108 or the core network 102 can mathematically generate training data, access files that store the training data, obtain real-world communications data, etc. The BS 108 or core network 102 then extracts and stores the various learned neural network architecture configurations for subsequent use. Some implementations store input characteristics with each neural network architecture configuration, whereby the input characteristics describe various properties of the RF signal propagation environment corresponding to the respective neural network architecture configurations, including the particular subset of active sensors and their corresponding parameter configurations. In implementations, a neural network manager selects a neural network architecture configuration by matching a current RF signal propagation environment and current operating environment to the input characteristics, with the current operating environment including indications of those sensors that are active, or which are available and can be made active with the appropriate parameters for participating in the sensor-and-transceiver fusion operations.

Figure 4:
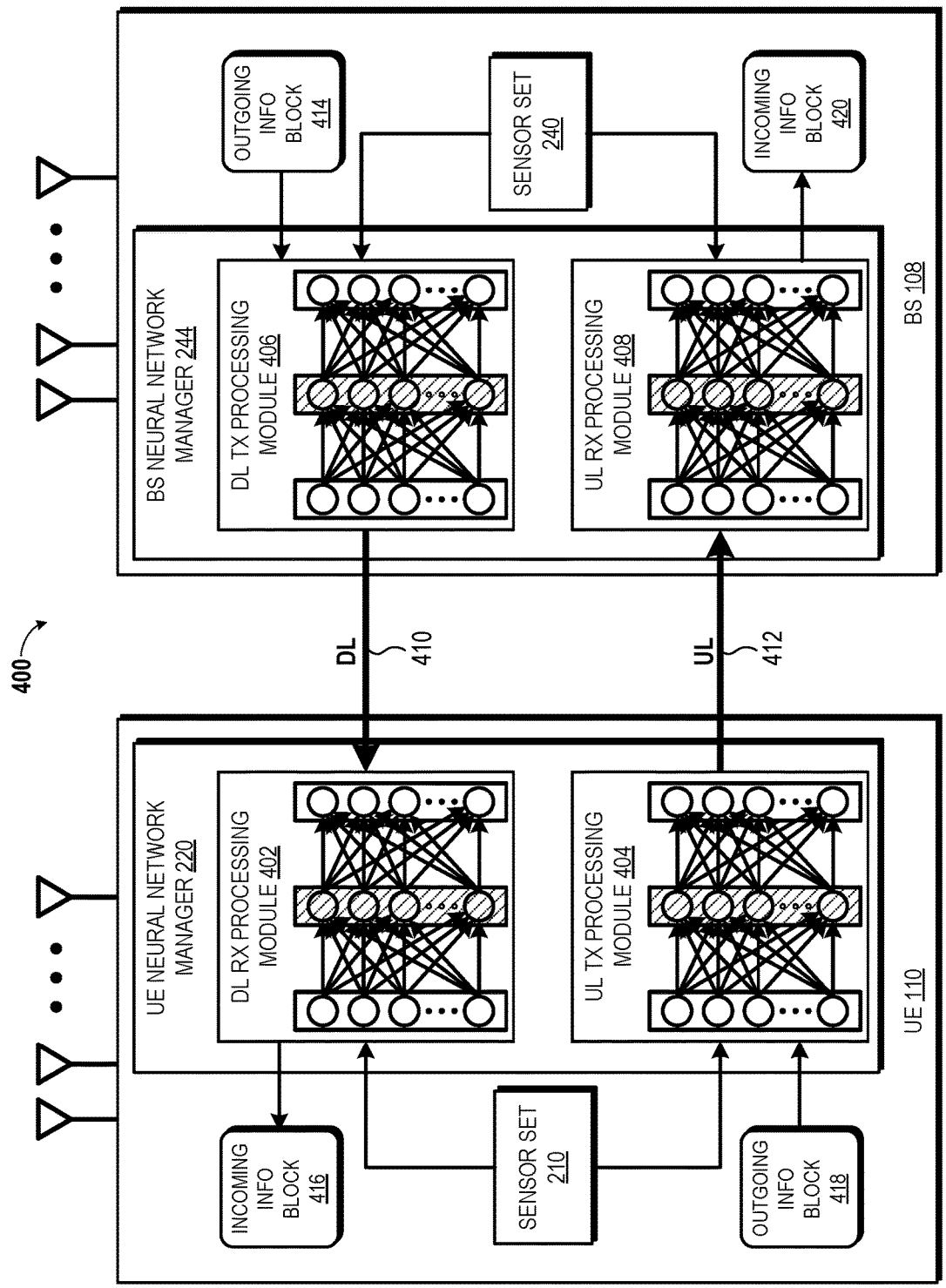
FIG. 4 is a diagram illustrating an example implementation of neural network managers of a BS and a UE in accordance with some embodiments.

As noted, network devices that are in wireless communication, such as the UE 110 and the BS 108, can be configured to process wireless communication exchanges using one or more DNNs at each networked device, where each DNN replaces one or more functions conventionally implemented by one or more hard-coded or fixed-design blocks (e.g., uplink processing, downlink processing, uplink encoding processing, downlink decoding processing, etc.). Moreover, each DNN can further incorporate current sensor data from one or more sensors of a sensor set of the networked device to, in effect, modify or otherwise adapt its operation to account for the current RF signal propagation environment reflected in the sensor data. To this end, FIG. 4 illustrates an example operating environment 400 for DNN implementation at the UE 110 and the BS 108. In the depicted example, the UE neural network manager 220 of the UE 110 implements a downlink (DL) receiver (RX) processing module 402 and an uplink (UL) transmitter processing module 404. Similarly, the BS neural network manager 244 implements a DL TX processing module 406 and a UL RX processing module 408. Each of the processing modules 402, 404, 406, and 408 implements one or more DNNs via the implementation of a corresponding ML module, such as described above with reference to the one or more DNNs 302 of the ML module 300 of FIG. 3.

The DL TX processing module 406 of the BS 108 and the DL RX processing module 402 interoperate to support a DL wireless communication path 410 between the BS 108 as the data-sending device and the UE 110 as the data-receiving device, while the UL TX processing module 404 of the UE 110 and the UL RX processing module 408 of the BS 108 interoperate to support a UL wireless communication path 412 between the UE 110 as the data-sending device and the BS 108 as the data-receiving device. As such, the one or more DNNs of the DL TX processing module 406 are trained to receive DL data and DL control-plane information as inputs in the form of outgoing information blocks 414, to receive sensor data from the sensor set 240, and to generate corresponding outputs for transmission as RF signals via an RF analog stage of the BS 108. The one or more DNNs of the DL RX processing module 402 conversely are trained to receive the outputs extracted from the transmitted RF signals by an RF analog stage as inputs, along with sensor data from the sensor set 210, and to generate as outputs the recovered DL data and the DL control-plane information as incoming information blocks 416 for further processing at the UE 110. In a similar manner, the one or more DNNs of the UL TX processing module 404 are trained to receive as inputs UL data and UL control-plane information in the form of outgoing information blocks 418 as well as sensor data from the sensor set 210 and to generate corresponding outputs for transmission as RF signals via the RF analog stage of the UE 110. The one or more DNNs of the UL RX processing module 408 conversely are trained to receive the outputs extracted from the transmitted RF signals by the RF analog stage as inputs and to generate as outputs the recovered UL user-plane data and the UL control-plane information in the form of incoming information blocks 420 for further processing at the BS 108.

Figure 5:
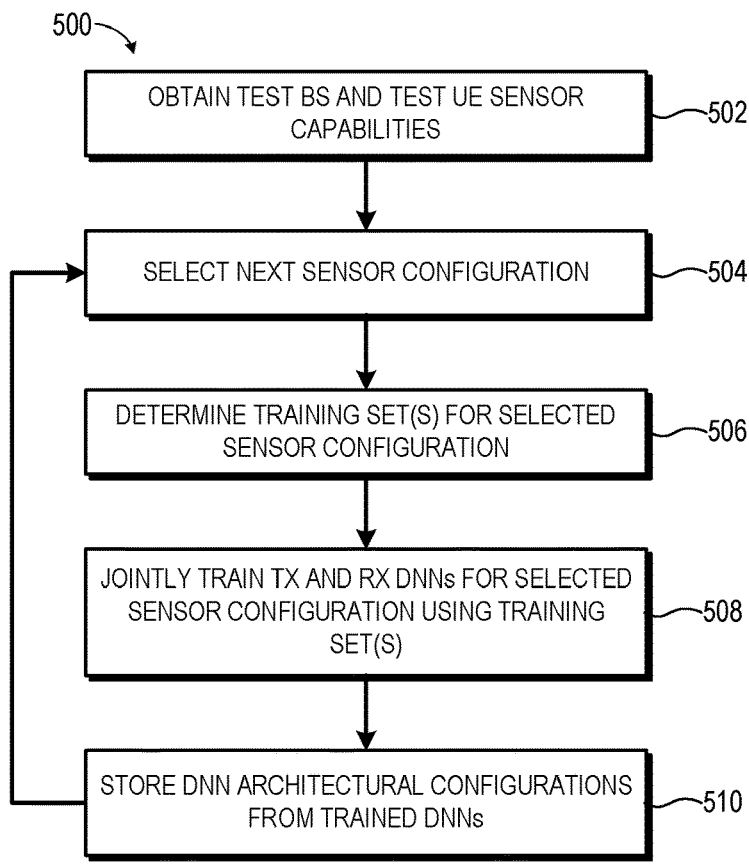
FIG. 5 is a flow diagram illustrating an example method for joint training of neural networks of a base station and a UE in accordance with some embodiments.

The implementation of certain functions of the transmitter processing path and the receiver processing path of each of the BS 108 and the UE 110 using DNNs or other neural networks, in combination with the input of sensor data to the DNNs, and the training of the DNNs on the sensor data, provides flexibility in design and facilitates efficient updates relative to conventional per-block design and text approaches, while also allowing the BS 108 and UE 110 to quickly adapt their processing of outgoing and incoming transmissions to the current RF signal propagation environment shared between the BS 108 and the UE 110. However, before the DNNs can be deployed and put into operation, they typically are trained or otherwise configured to provide suitable outputs for a given set of one or more inputs. To this end, FIG. 5 illustrates an example method 500 for developing one or more jointly-trained DNN architectural configurations as options for implementation at the BS 108 and the UE 110 for different operating environments in accordance with some embodiments. Note that the order of operations described with reference to FIG. 5 are for illustrative purposes only, and that a different order of operations may be performed, and further that one or more operations may be omitted or one or more additional operations included in the illustrated method. Further note that while FIG. 5 illustrates an offline training approach using one or more test BSs and one or more test UEs, a similar approach may be implemented for online training using one or more BSs and UEs that are in active operation.

In at least one embodiment, either or both of the BS 108 and the UE 110 may have any of a variety of combinations of sensor capabilities. For example, sometimes a UE light sensor and capacitive touch sensor will be on while at other times the UE will turn off its light sensor and capacitive touch sensor to conserve power. As another example, some UEs 110 may have satellite-based positioning sensors, whereas other UEs 110 may not. Likewise, one BS 108 may have radar or lidar capabilities but no camera capabilities, whereas another BS 108 may have camera capabilities but no radar or lidar capabilities. Because the DNNs implemented at the BS 108 and UE 110 utilize sensor data to dictate their operations, it will be appreciated that in many instances the particular DNN configuration implemented at one of these networked devices is based on the particular sensors available to provide sensor data as input; that is, the particular DNN configuration implemented is reflective of the type and combination of sensors currently providing input to the DNN.

Accordingly, the method 500 initiates at block 502 with the determination of the sensor capabilities of one or more test UEs and one or more test BSs, which may include the UE 110 and/or BS 108 or may utilize UEs and/or BSs other than the UE 110 and/or the BS 108. For the following, it is assumed that a training module 250 of the test BS is managing the joint training, and thus the sensor capabilities of the test BS are known to the training module 250 (e.g., via a database or other locally-stored data structure storing this information). However, because the test BS likely does not have a priori knowledge of the capabilities of any given UE, the test UE provides the test BS with an indication of the sensor capabilities of the UE under test, such as an indication of the types of sensors available at the test UE, an indication of various parameters for these sensors (e.g., imaging resolution and picture data format for an imaging camera, satellite-positioning type and format for a satellite-based position sensor, etc.), and the like. For example, the test UE can provide this indication of sensor capabilities as part of the UECapabilityInformation Radio Resource Control (RRC) message typically provided by UEs in response to a UECapabilityEnquiry RRC message transmitted by a BS in accordance with at least the 4G LTE and 5G NR specifications. Alternatively, the test UE can provide the indication of sensor capabilities as a separate side-channel or control-channel communication. Further, in some embodiments, the sensor capabilities of the test UE may be stored in a local or remote database available to the test BS, and thus the test BS can query this database based on some form of identifier of the UE, such as an International Mobile Subscriber Identity (IMSI) value associated with the UE under test.

With the sensor capabilities of the test BS and test UE so identified, at block 504 the training module 250 selects a particular sensor configuration for which to train the DNNs of the test BS and the test UE. In some embodiments, the training module 250 may attempt to train every permutation of the available sensors. However, in implementations in which non-test BSs and non-test UEs have a relatively large number and variety of suitable sensors, this effort may be impracticable. Accordingly, in other embodiments the training module 250 selects from only a limited, representative set of potential sensors and sensor configurations. To illustrate, lidar information from different lidar modules manufactured by the same company may be relatively consistent, and thus if, for example, a BS 108 could implement any of a number of lidar sensors from that manufacturer, the training module 250 may choose to eliminate several lidar sensors from the sensor configurations being trained. In still other embodiments, there may be a defined set of sensor configurations the training module 250 can select for training, and the training module 250 thus selects a sensor configuration from this defined set (and avoid selection of a sensor configuration that relies on a sensor capability that is not commonly supported by the associated device).

With a sensor configuration selected, at block 506 the training module 250 identifies one or more sets of training data for use in jointly training the DNNs based on the selected sensor configuration. That is, the one or more sets of training data include or represent sensor data that could be generated by the comparable sensors of the selected sensor configuration, and thus suitable for training the DNNs to operate with sensor data provided by the particular sensors represented in the selected sensor configuration. The training data further can include associated metrics involved with the transmission or receipt of signaling during training, such as block error rate (BER), signal-to-noise ratio (SNR), signal-to-interference-plus-noise ratio (SINR), and the like.

With one or more training sets obtained, at block 508 the training module 250 initiates the joint training of the DNNs at a test BS with the DNNs at a test UE. This joint training typically involves initializing the bias weights and coefficients of the various DNNs with initial values, which generally are selected pseudo-randomly, then inputting a set of training data (representing, for example, known user-plane data and control-plane information, as well as known sensor data from sensors in the selected sensor configuration) at a TX processing module of a first device (e.g., the test BS), wirelessly transmitting the resulting output as a transmission to the RX module of a second device (e.g., the test UE), processing the transmission at the RX processing module of the second device, determining an error between the actual result output and the expected result output, and backpropagating the error throughout the DNNs of both the TX processing module of the first device and the RX processing module of the second device, and repeating the process for the next set of input data. This process repeats until a certain number of training iterations have been performed or until a certain minimum error rate has been achieved. This same process is performed between the TX processing module of the second device and the RX processing module of the first device.

As a result of the joint (or individual) training of the DNNs of the test BS and test UE, each neural network has a particular neural network architectural configuration, or DNN architectural configuration in instances in which the implemented neural networks are DNNs, that characterizes the architecture and parameters of corresponding DNN, such as the number of hidden layers, the number of nodes at each layer, connections between each layer, the weights, coefficients, and other bias values implemented at each node, and the like. Accordingly, when the joint or individual training of the DNNs of the test BS and the test UE for the selected sensor configuration is complete, at block 510 some or all of the trained DNN configurations are distributed to the BS 108 and the UE 110 and the BS 108 and UE 110 each stores the resulting DNN configurations of their corresponding DNNs as a DNN architectural configuration for the BS 108 for the selected sensor configuration and as a DNN architectural configuration for the UE 110 for the selected sensor configuration. In at least one embodiment, the DNN architectural configuration can be generated by extracting the architecture and parameters of the corresponding DNN, such as the number of hidden layers, number of nodes, connections, coefficients, weights, and other bias values, and the like, at the conclusion of the joint training.

In the event that there are one or more other sensor configurations remaining to be trained, then the method 500 returns to block 504 for the selection of the next sensor configuration to be jointly trained, and another iteration of the subprocess of blocks 504-510 is repeated for the next sensor configuration selected by the training module 250. Otherwise, if the DNNs of the BS 108 and the UE 110 have been jointly trained for all intended sensor configurations, then method 500 completes and the system 100 can shift to supporting RF signaling between the BS 108 and the UE 110 using the trained DNNs, as described below with reference to FIGS. 7-9.

As noted above, the joint training process can be performed using offline test BSs and UEs (that is, while no active communications of control information or user-plane data are occurring) or while the processing modules of the test BSs and UEs are online (that is, while active communications of control information or user-plane data are occurring). Further, in some embodiments, rather than training all of the DNNs jointly, in some instances, a subset of the DNNs can be trained or retrained while other DNNs are maintained as static. To illustrate, the BS neural network manager 244 may detect that a particular processing module, such as the UE DL TX processing module 406, is operating inefficiently or incorrectly due to, for example, the presence of an undetected interferer near the UE 110, and thus the BS neural network manager 244 may schedule individual retraining of the DNN(s) of the UE DL TX processing module 406 while maintaining the other DNNs of the other processing modules 402, 404, 408 in their present configurations.

Further, it will be appreciated that, although there may be a wide variety of UEs supporting a large number of sensor configurations, many different UEs may support the same or similar sensor configuration. Thus, rather than have to repeat the joint training for every UE 110 that is attempting to communicate with the BS 108, following joint training of a representative test UE, the test UE can transmit a representation of its trained DNN architectural configuration for a given sensor configuration to the BS 108, whereupon the BS 108 can store the DNN architectural configuration and subsequently transmit it to other UEs 110 that support the same or similar sensor configuration for implementation in the DNNs of that UE 110.

Moreover, it will be appreciated that the DNN architectural configurations often will change over time as the corresponding device operates using the DNN. In the case of the DNNs of the UE 110, the UE neural network manager 220 can be configured to transmit a representation of the updated architectural configurations of one or more of the DNNs of the UE 110, such as by providing the updated gradients and related information, to the BS 108 in response to a trigger. This trigger may be expiration of a periodic timer, a query from the BS 110, a determination that the magnitude of the changes has exceeded a specified threshold, and the like. The BS 108 may then incorporate these received DNN updates into the corresponding DNN architectural configuration and thus have an updated DNN architectural configuration available for distribution to other UEs 110.

Figure 6:
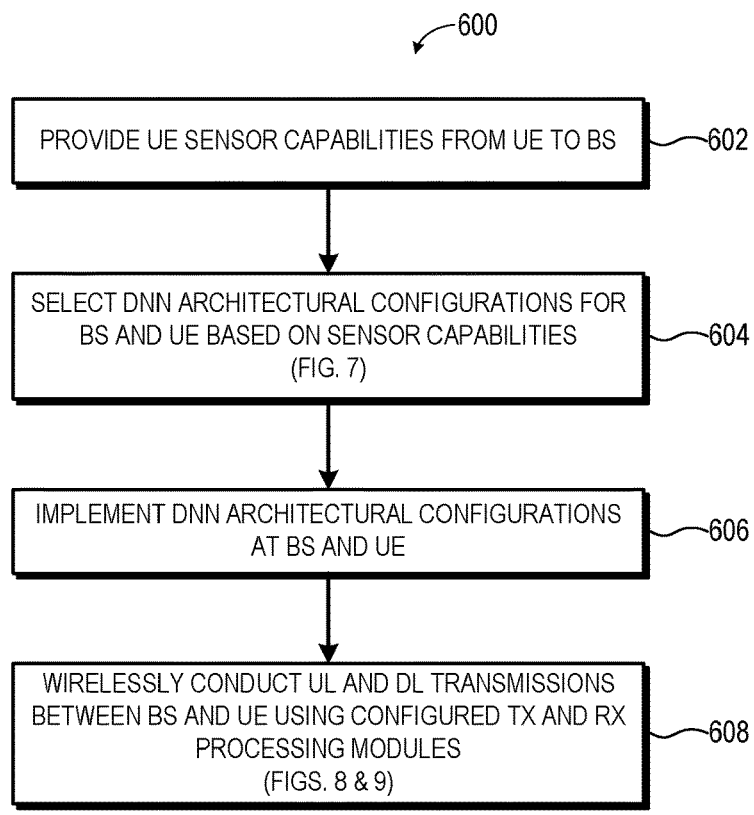
FIG. 6 is a flow diagram illustrating an example method for wireless communication between a BS and a UE using jointly-trained neural networks providing sensor-and-transceiver fusion in accordance with some embodiments.

FIG. 6 illustrates an example method 600 for initiating the BS 108 and the UE 110 for conducting DL and UL wireless transmissions using trained DNNs in accordance with some embodiments. As explained above, because the operation of a DNN with a particular DNN architectural configuration assumes a particular sensor configuration, the method 600 initiates at block 602 with the UE 110 providing a representation of its sensor capabilities to the BS 108 as described with reference to block 502.

At block 602, the BS neural network manager 244 selects a respective DNN architectural configuration (e.g., trained DNN architectural configuration 248) for implementation at each of the DNNs of the BS 108 based on one or both of the sensor capabilities of the BS 108 or the sensor capabilities advertised by the UE 110. For example, if the BS 108 has a radar sensor available for use, and the UE 110 has an imaging camera and a GPS sensor available for use, the BS 108 may select DNN architectural configurations for its TX and RX DNNs that have been trained for this sensor configuration. Although in some embodiments the sensor capabilities of both the BS 108 and UE 110 are considered in selecting a DNN architectural configuration, in other embodiments the selection of a DNN architectural configuration is limited to the only the sensor configuration of the device implementing the DNN architectural configuration. For example, individual or joint training of the DNN for a given sensor configuration of the BS 108 may be entirely independent of the sensors utilized by the UE 110, and thus the particular sensor capabilities of the UE 110 may not influence the selection of DNN architectural configurations for the DNNs of the BS 108, and vice versa.

Block 604 further includes selection of the appropriate DNN architectural configuration for the UE 110 based on sensor capabilities. In some embodiments, the BS neural network manager 244 selects the DNN architectural configurations to be employed by the DNNs of the UE 110 and transmits an indicator of the selected DNN architectural configurations, or transmits data representing the selected DNN architectural configurations themselves, to the UE 110 for implementation. For example, in implementations in which the DNNs of the UE 110 have been trained in a manner dependent on the particular sensor configuration employed at the BS 108, then it may be more practical for the BS 108 to use its knowledge of its current sensor configuration to select the appropriate DNN architectural implementations for the UE 110, rather than to supply some indication of the sensor configuration of the BS 108 to the UE 110. In other embodiments, the UE neural network manager 220 of the UE 110 selects the DNN architectural configurations to implement based on the current sensor configuration of the UE 110 independent of direction from the BS 108. For example, the DNN architectural configurations available for implementation of the UE 110 may be independent of the particular sensor configuration of the BS 108, or the UE 110 may have separately obtained information regarding the sensor configuration of the BS 108, such as by assuming a default sensor configuration or by obtaining the sensor configuration of the BS 108 based on a database, from an identifier associated with the BS 108, or other source.

Figure 7:
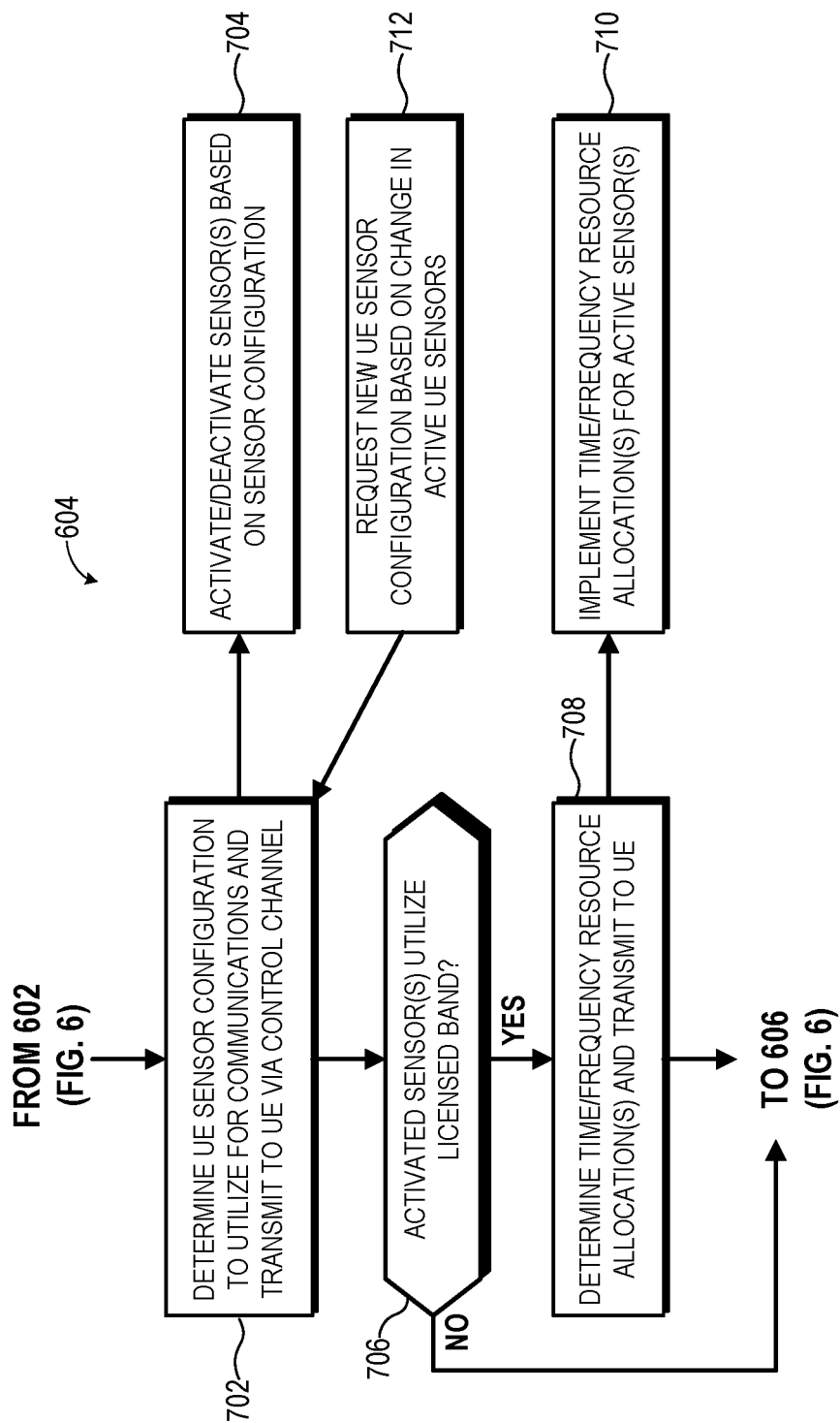
FIG. 7 is a flow diagram illustrating an example method for selection and configuration of jointly-trained neural networks for providing sensor-and-transceiver fusion in accordance with some embodiments.

Turning briefly to FIG. 7, an example implementation of the process of block 604 is illustrated in accordance with some embodiments. For this implementation, it is assumed that the BS 108 controls certain operational aspects of the UE 110 with regard to the DNN configuration and sensor configuration of the UE 110, such as the selection of those sensors of the sensor set 210 to employ at the UE 110 for the sensor-fusion scheme and the DNN configuration architectures to be implemented at the DNNs of the UE 110. Accordingly, at block 702 the BS neural network manager 244 selects a sensor configuration to be implemented based on the sensor capabilities advertised by the UE 110, and in some embodiments, based on the previously-trained DNN architectural configurations for the UE 110 that were trained based on compatible sensor capabilities. The BS 108 then transmits an indication of the selected sensor configuration to the UE 110 via a control channel or other communications path.

At block 704, the UE 110 receives the indication of the selected sensor configuration and then selectively activates or deactivates sensors of the sensor set 210 to implement the indicated sensor configuration. Note that the deactivation of a sensor that is not to be included in the sensor configuration does not require deactivation of the sensor for all purposes, but merely that the sensor is effectively inactive for the purposes of providing sensor data 130, 164 from that sensor as input to the corresponding DNN. This can be achieved by actual power-down or other deactivation of the sensor. However, the sensor may still be in use for other operations, and thus instead of fully deactivating the sensor, the sensor management module 226 instead can be configured to prevent any sensor data from that sensor from being input to the DNNs of the UE 110. To illustrate, an imaging camera of the UE may not be used to provide sensor input to be fused with input communication information at a DNN of the UE 110, but it may be employed at that time for use in capturing video of the surrounding environment. The sensor management module 226 thus may operate to filter out the video content captured by the imaging camera from the sensor data fed to the input of the DNNs of the UE 110.

At block 706, the BS neural network manager 244 determines whether any of the sensors of the sensor set 210 of the UE 110 that are to be activated in the selected sensor configuration are sensors that operate in a licensed frequency band, which typically requires that the sensor be allocated one or both of time resources or frequency resources (such as allocation of a particular channel frequency or frequency spectrum) in order to operate in a manner that limits impact on other transmissions. If the sensor configuration includes one or more of such sensors of the UE 110, then at block 708 the RF resource management module 254 of the BS 108 operates to allocate the appropriate resources to the one or more sensors of the UE 110 requiring such allocations and transmits a representation of the allocated resources for the identified sensor(s) to the UE 110. At block 710, the RF resource management module 228 of the UE 110 receives the indicated resource allocation(s) and configures the impacted sensors of the sensor set 210 accordingly. To illustrate, a radar sensor of the UE 110 may be configurable to operate at any of a variety of frequencies within a licensed or lightly-licensed spectrum, and thus the BS 108 may choose a particular operating frequency for the radar sensor so as to reduce the chance of the radar signaling interfering with other devices in the proximity of the UE 110.

It will be appreciated that in some instances, the UE 110 may be incapable of implementing the sensor configuration dictated by the BS 108, either at the initial configuration or due to a change in circumstances as operation progresses. For example, in the time between advertisement of the sensor capabilities to the BS 108 and the start of the sensor configuration process, one of the sensors advertised by the UE 110 as being available may have become unavailable, such as because the sensor is being utilized for another process in a way that makes it concurrently unsuitable for use in the sensor-and-transceiver fusion scheme, because the UE 110 lacks sufficient remaining battery power to make operation of the sensor unadvisable, and the like. Accordingly, as represented by block 712, when the BS 108 sends the UE 110 a sensor configuration that the UE 110 cannot practically support, either initially or later during continued operation, the UE 110 can operate to transmit to the BS 108 a Not Acknowledged (NACK) message or other indication that it is unable to implement the specified sensor configuration. In response, the BS 108 can select a different sensor configuration that does not include the impacted sensor. Likewise, if the UE 110 has received and implemented the specified sensor configuration, but the circumstances of the sensor set 210 change such that one or more sensors of the sensor configuration are impacted, block 712 also represents the process of the UE 110 signaling that the current sensor configuration is no longer workable, and thus triggering the BS 108 to discontinue use of the current DNNs and restart the process of method 600 to select a new sensor configuration that avoids use of the unavailable sensor and to select and implement the appropriate DNN architecture configurations that are compatible with the newly selected sensor configuration.

Returning to FIG. 6, with the DNN architectural configurations selected for each of the DNNs of the BS 108 and the UE 110, at block 606 the BS neural network manager 244 configures the DNNs of the BS 108 in accordance with the selected DNN architectural configurations selected for the BS 108, and the UE neural network manager 220 configures the DNNs of the UE 110 in accordance with the selected DNN architectural configurations selected for the UE 110. After the DNNs are initiated, at block 608 the BS 108 and UE 110 can conduct UL and DL transmissions utilizing the initiated DNNs.

The sensor-and-transceiver-fusion scheme provided by the trained DNNs of the BS 108 and the UE 110 facilitates effective RF communications between the BS 108 and the UE 110 as the use of sensor data regarding the RF signal propagation environment between the BS 108 and the UE 110 can allow the DNNs to more effectively control the communication schemes for communicating outgoing information and incoming information. This is illustrated by way of the following examples.

In one example, the one or more DNNs of the DL TX processing module 406 of the BS 108 are trained on training sets that included sensor data generated by a test BS radar sensor equivalent to a radar sensor employed in the sensor set 240 of the BS 108. Accordingly, when in operation, sensor data from the radar sensor of the BS 108 is supplied to the DNNs. In an instance where, for example, the sensor data from the radar sensor indicates that there are interfering objects in the LOS path between the BS 108 and the UE 110, this situation may cause the one or more DNNs of the DL TX processing module 406 to, in effect, reconstruct or otherwise identify the dominant NLOS propagation path between the BS 108 and the UE 110 and generate an output that includes control signaling that directs the RF front end 234 of the BS 108 to employ 5G NR millimeter-wave (mmWave) beamforming configuration for the antenna array 230 of the BS 108 so as to direct a transmission beam for communicating RF signals representative of a DL information block concurrently input to, and processed by, DNNs of the DL TX processing module 406.

As another example, the one or more DNNs of the UL TX processing module 404 of the UE 110 may currently implement DNN architectural configurations trained on sensor data from a GNSS sensor. When an equivalent GNSS sensor of the sensor set 210 of the UE 110 provides sensor data that represents a location, velocity, and bearing of the UE 110, this sensor data input to the DNNs of the UL TX processing module 404 may, in effect, be processed by the DNNs concurrent with an outgoing information block to form an output that includes control signaling that causes the RF front end 204 of the UE 110 to compensate for Doppler shift due to the movement of the UE 110, as well negotiate a scheduling and handover decision with the BS 108 so as to, for example, switch from using a THz-based RAT to using a 4G LTE RAT for communicating the resulting RF signaling representative of the outgoing information block to the BS 108.

As a further scheduling/handover-based example, the one or more DNNs of the UL TX processing module 404 of the UE 110 may currently implement DNN architectural configurations trained on sensors that may indicate whether, for example, mmWave signaling to and from the UE 110 is blocked, such as via an imager or radar that detects the presence of an interfering object. When sensor data from the sensor set 210 provides sensor data that represents such a blockage, this sensor data input to the DNNs of the UL TX processing module 404 may, in effect, be processed by the DNNs concurrent with an outgoing information block to form an output that includes control signaling that causes the RF front end 204 of the UE 110 to schedule the resulting transmission on a lower frequency band that is not blocked by the detected interfering object.

As yet another example, the one or more DNNs of the UL TX processing module 404 of the UE 110 may currently implement DNN architectural configurations trained on sensor data from a camera and sensor data from an IMU. When an equivalent camera and an equivalent gyroscope of the sensor set 210 of the UE 110 provide sensor data that represents that a densely-leafed branch is interposed in the LOS path between the currently activated antenna array 203 of the UE 110 and the BS 108, this sensor data input to the DNNs of the UL TX processing module 404 may, in effect, be processed by the DNNs concurrent with an outgoing information block to form an output that includes control signaling to causes the RF front end 204 of the UE 110 to either increase a transmit power of the currently active antenna array 203 in an attempt to overcome the attenuation likely presented by the branch or to switch to using a different antenna array 203 that presents a suitable NLOS path between the UE 110 and the BS 108. Likewise, in this example, the BS 108 employs one or more DNNs in the UL RX processing module 408 implementing DNN architectural configurations trained on sensor data from a camera, such that sensor data from a camera of the BS 108 that likewise indicates the presence of the leafy branch in the LOS path in effect cause the one or more DNNs in the UL RX processing module 408 to generate as part of their output control signaling to cause the RF front end 234 of the BS 108 to one or both of increase receiver sensitivity or switch to another antenna array 230 so as to compensate for the anticipated interference caused by the leafy branch.

As an additional example, the UE 110 may be implemented as a smartwatch having a camera, and with the one or more DNNs of the UL TX processing module 404 implementing DNN architecture configurations trained using training sensor data from an equivalent camera. When the user's jacket sleeve is covering the smartwatch, this is represented in the sensor data provided by the camera and, in effect, can cause the one or more DNNs of the UL TX processing module 404 to generate an output that includes control signaling to direct the RF front end 204 of the UE 110 to either increase the transmit power in an attempt to overcome the possible signal interference caused by the overlying jacket sleeve, or to negotiate a switch to signaling in a lower frequency spectrum so as to mitigate the RF absorption of the jacket sleeve.

As a further example, the UE 110 may be implemented as a smartphone or tablet having a capacitive touchscreen, and with the one or more DNNs of the UL TX processing module 404 implementing DNN architecture configurations trained using training sensor data from an equivalent touch screen. When the touchscreen of the UE 110 provides sensor data indicating user contact with the touchscreen, this indicates a high likelihood that the user is positioned facing the touchscreen. Accordingly, sensor data from the touchscreen indicating current user contact can, in effect, inform the one or more DNNs of the UL TX processing module 404 of the likely orientation of the UE 110 relative to the user and thus cause these one or more DNNs to generate an output that includes control signaling to direct the RF front end 204 of the UE 110 to control beamforming so as to utilize a beam direction that does not intersect the body of the user and thus avoids the RF interference that otherwise would be caused by the user's position relative to the UE 110.

Figure 8:
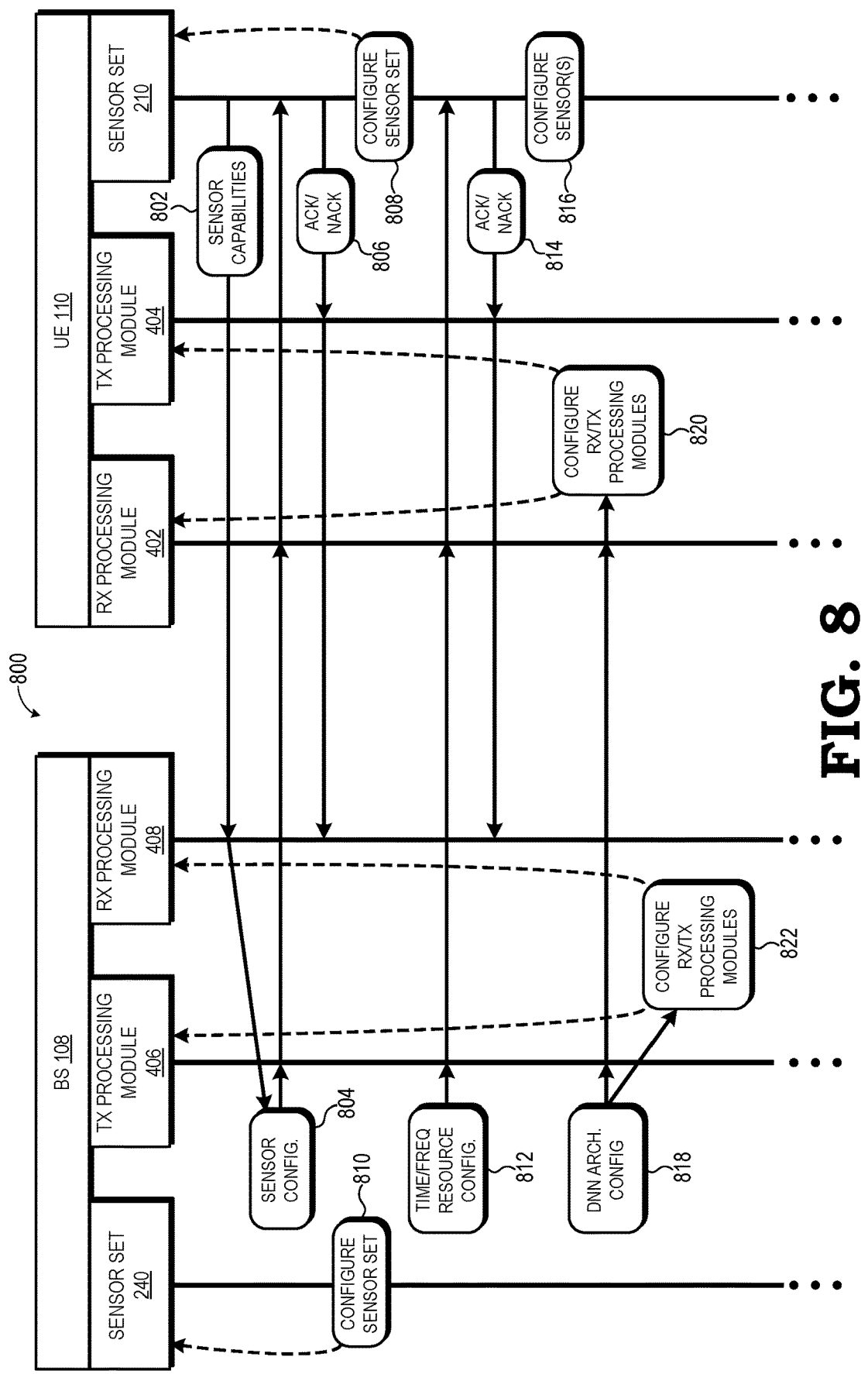
FIG. 8 is a diagram illustrating an example operation of the method of FIG. 7 in accordance with some embodiments.
Figure 9:
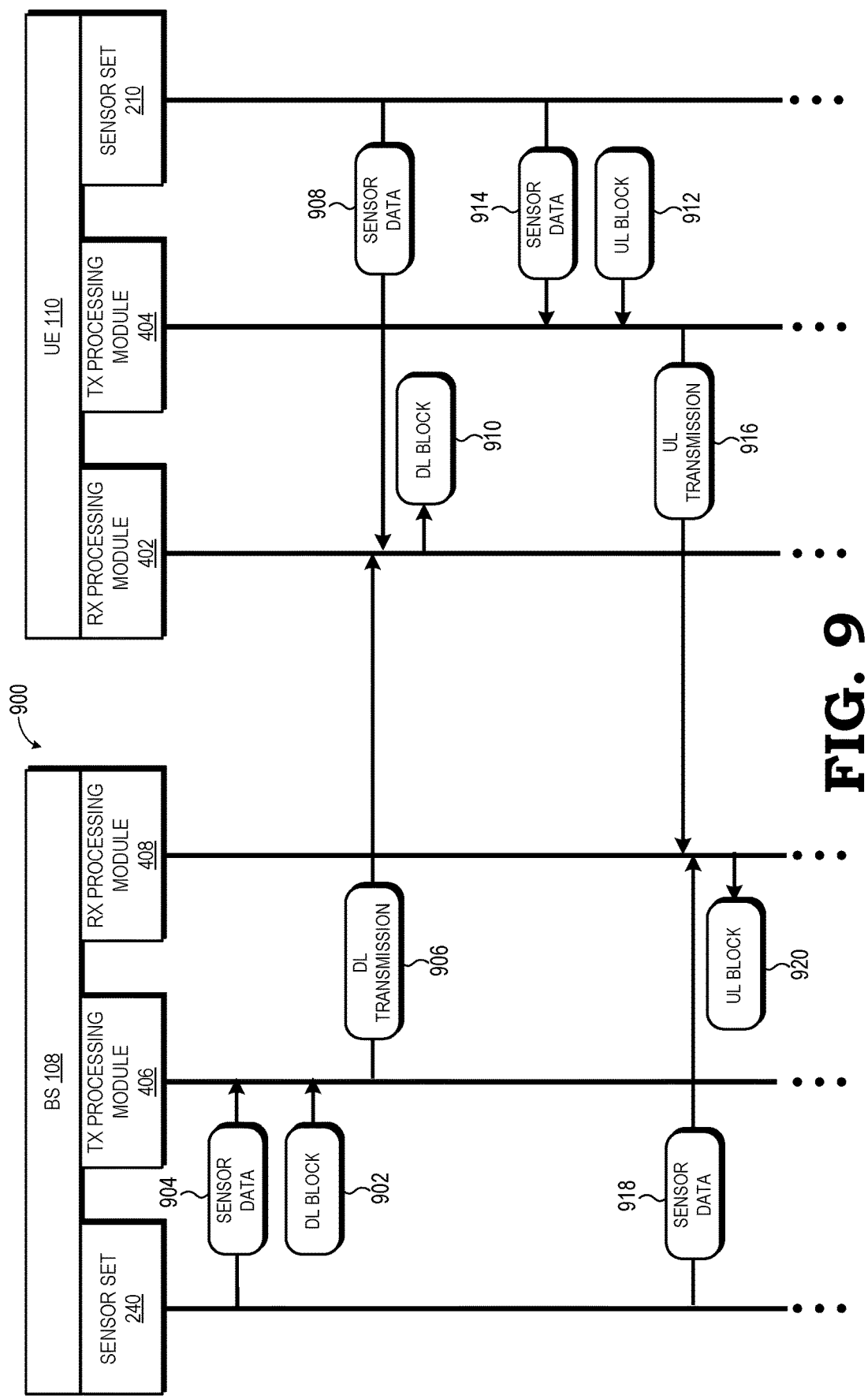
FIG. 9 is a diagram illustrating an example sensor-and-transceiver fusion-based wireless communication process between a BS and a UE configured as depicted in the example of FIG. 8 in accordance with some embodiments.

Turning now to FIGS. 8 and 9, transaction diagrams depicting an example of the configuration and operation of the BS 108 and the UE 110 in accordance with a neural-network-based sensor-and-transceiver fusion scheme are shown in accordance with at least one embodiment. FIG. 8 illustrates a transaction diagram 800 for the initial configuration of the BS 108 and the UE 110 for implementing particular DNN architectural configurations trained in accordance with selected sensor configurations for the BS 108 and the UE 110. This process is initiated at block 802 with the UE 110 transmitting a representation of its current sensor capabilities to the BS 108 as, for example, part of the UECapabilitiesInformation RRC message often provided by a UE in response to a UECapabilitiesEnquiry RRC message from a BS.

At block 804, the BS neural network manager 244 of the BS 108 considers the advertised sensor capabilities of the UE 110 and the BS 108 to determine a sensor configuration to be implemented by the UE 110 and provides a representation of this selected sensor configuration for transmission to the UE 110. In other embodiments, rather than selecting a particular sensor configuration for the UE 110, the BS 108 may assume that all sensors advertised by the UE 110 are to be implemented, or there may be DNN architectural configurations available that can adapt to different sensor combinations, and thus not require selection and indication of a particular sensor configuration for the UE 110. However, for the following, it is assumed that a particular sensor configuration is selected and transmitted to the UE 110. In response, the sensor management module 226 of the UE 110 evaluates the proposed sensor configuration and replies with either an ACK or a NACK message depending on whether the UE 110 can implement the sensor configuration as proposed. To illustrate, in some instances a sensor selected for inclusion in the sensor configuration may be currently in use in a way that is incompatible with its intended use in the sensor-and-transceiver fusion scheme, or circumstances have changed at the UE 110 such that the UE 110 is no longer capable of maintaining a particular sensor in an active state, such as when the battery power falls below a particular threshold or the user has manually deactivated the sensor. In such instances, a NACK may be transmitted from the UE 110 to the BS 108, which in turn triggers the BS 108 to select a different sensor configuration based on this information. However, for purposes of this example, it is assumed that the proposed sensor configuration has been accepted by the UE 110, and thus an ACK message is transmitted back to the BS 108 at block 806 to acknowledge receipt of the proposed sensor configuration.

With the proposed sensor configuration being accepted, at block 808 the sensor management module 226 configures the sensor set 210 of the UE 110 to implement the proposed sensor configuration. This can include activating those sensors included in the sensor configuration and deactivating the remaining sensors or implementing a filter so that only sensor data from those sensors included in the sensor configuration is provided as input to the corresponding DNNs. In some embodiments, the BS 108 may also have a corresponding sensor configuration to be employed for providing sensor data to the RX and TX processing modules of the BS 108, in which case at block 810 the sensor management module 252 of the BS 108 implements the sensor configuration for the BS 108, such as by implementing one or more filters to provide only the sensor data from the sensors of the sensor set 240 included in the BS sensor configuration to the TX and RX modules of the BS 108.

In this example, one or more of the sensors included in the UE sensor configuration operate in a licensed frequency band, and thus at block 812 the RF resource management module 254 of the BS 108 determines a resource allocation configuration that includes an allocation of one or both of time resources or frequency resources to each of such sensors and transmits a representation of the resource allocation configuration to the UE 110. The RF resource management module 228 of the UE 110 evaluates this resource allocation configuration to determine whether it can be implemented for the corresponding sensors of the sensor set 210, and at block 814 the UE 110 either sends an ACK message or NACK message depending on whether the proposed resource allocation configuration can be implemented. For purposes of the following, it is assumed that the resource allocation configuration can be implemented, and thus an ACK message is sent. Accordingly, at block 816 the sensor management module 226 of the UE 110 configures the affected sensors of the sensor set 210 to implement the time/frequency resources indicated in the resource allocation configuration.

At block 818, the BS 108 selects the DNN architectural configuration(s) to be implemented by the DNNs of the BS 108 and the UE 110. In the illustrated example, the BS 108 makes this selection based on the sensor configurations previously selected for implementation, such that the BS 108 selects those DNN architectural configuration(s) that have been trained or otherwise configured to be compatible with the type of sensor data to be provided by the sensors of the corresponding sensor configuration. However, in other embodiments, the BS 108 instead may first select the DNN architectural configurations to be employed, and then select compatible sensor configurations for one or both of the BS 108 and the UE 110 based on the selected DNN architectural configurations. The BS 108 then transmits to the UE 110 a representation of the selected DNN architectural configuration(s) for each of the DNNs implemented at the DL RX processing module 402 and UL TX processing module 404 of the UE 110. This representation can include, for example, a corresponding unique identifier associated with each of the DNN architectural configurations locally stored at the UE 110 or available to the UE 110 from the BS 108 or another entity. In other embodiments, the UE 110 is configured to select its own DNN architectural configurations independent of the BS 108. In either approach, at block 820 the UE neural network manager 220 configures the DL RX processing module 402 and the UL TX processing module 404 to implement the identified DNN architectural configuration(s) for the UE 110. Likewise, at block 822, the BS neural network manager 244 configures the DL TX processing module 406 and the UL RX processing module 408 to implement the identified DNN architectural configuration(s) for the BS 108.

With the DNNs configured, the BS 108 and UE 110 are ready to begin sensor-fusion-based, DNN-facilitated communications. FIG. 9 illustrates a transaction diagram 900 depicting an example DL transmission and an example UL transmission between the BS 108 and UE 110 as configured from the transaction diagram 800 of FIG. 8. At block 902 a processor or other component of the BS 108 generates information to be communicated to the UE 110 in the form of a DL information block having the form of a sequence or other structure of bits, which is provided as an input to the one or more DNNs of the DL TX processing module 406. Concurrently, at block 904 sensor data from the sensors of sensor set 240 of the BS 108 included in the BS sensor configuration is provided as an input to the one or more DNNs of the DL TX processing module 406. These DNNs process these two inputs in accordance with their configured DNN architectural configurations to generate an output that includes information bits to be converted to RF signaling by the RF front end 234 of the BS 108 as a DL RF transmission 906, and further may include control signaling to control operation of the RF front end 234, such as control signaling to implement a particular beam management configuration, to control various RF transmission parameters such as transmission power or frequency band, to control the particular RAT employed to generate the corresponding RF signaling, and the like.

At the UE 110, the sensors of the sensor set 210 included in the UE sensor configuration provide current sensor data as an input to the one or more DNNs of the RX processing module 402 at block 908. Concurrently, the RF front end 204 of the UE 110 receives the RF signals representing the DL transmission and converts the RF signals to one or more outputs (e.g., baseband signals), which are provided as an input to the one or more DNNs of the RX processing module 402. The one or more DNNs of the RX processing module 402 then process this input along with the sensor data input to generate, at block 910, an output that can include a DL information block that represents the information of the DL information block generated at the BS 108. Further, in some embodiments, this output can include control information to control the RF front end 204 as it operates to receive the RF signals, such as control signaling to control a beamforming configuration, a receive sensitivity, and the like. The generated downlink information block is then provided to a processor or other component of the UE 110 for further processing.

For the uplink process, at block 912 a processor or other component of the UE 110 generates information to be communicated to the BS 108 in the form of a UL information block having the form of a sequence or other structure of bits, which is provided as an input to the one or more DNNs of the UL TX processing module 404 of the UE 110. Concurrently, at block 914 sensor data from the sensors of sensor set 210 of the UE included in the UE sensor configuration is provided as an input to the one or more DNNs of the UL TX processing module 404. These DNNs process these two inputs in accordance with their configured DNN architectural configurations to generate an output that includes information bits to be converted to RF signaling by the RF front end 204 of the UE 110 as a UL RF transmission 916, and further may include control signaling to control operation of the RF front end 204.

At the BS 108, the sensors of the sensor set 240 included in the BS sensor configuration provide current sensor data as an input to the one or more DNNs of the UL RX processing module 408 at block 918. Concurrently, at block 920 the RF front end 234 of the BS 108 receives the RF signals representing the UL RF transmission 916 and converts the RF signals to one or more outputs that are provided as an input to the one or more DNNs of the UL RX processing module 408. The one or more DNNs of the UL RX processing module 408 then process this input along with the sensor data input to generate, at block 920, an output that can include a UL information block that represents the information of the UL information block generated at the UE 110. Further, in some embodiments, this output can include control information to control the RF front end 234 as it operates to receive the RF signals. The generated UL information block is then provided to a processor or other component of the BS 108 for further processing.

In some embodiments, certain aspects of the techniques described above may be implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or another instruction format that is interpreted or otherwise executable by one or more processors.

A computer-readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A computer-implemented method, in a data sending device, comprising:
receiving a first information block as an input to a transmitter neural network of the data sending device, the first information block representing a set of information bits to be transmitted to a data receiving device;
receiving, as an input to the transmitter neural network, a first set of sensor data from a first set of one or more sensors of the data sending device;
processing the first information block and the first set of sensor data at the transmitter neural network to generate a first output; and
controlling the data sending device based on the first output to generate a first RF signal for wireless transmission to the data receiving device.

2. The method of claim 1, further comprising one of:
identifying a neural network architectural configuration to be implemented by the data sending device based on sensor capabilities of at least one of the data sending device or the data receiving device and implementing the neural network architectural configuration for the transmitter neural network; or
transmitting an indication of sensor capabilities of the data sending device to the data receiving device, receiving, from the data receiving device, a representation of a neural network architectural configuration that is based on the sensor capabilities of the data sending device, and implementing the neural network architectural configuration for the transmitter neural network.

3. The method of claim 1, further comprising:
receiving, from the data receiving device, a representation of sensor capabilities of the data receiving device;
determining a neural network architectural configuration to be implemented by a receiver neural network of the data receiving device based on the sensor capabilities of the data receiving device; and
transmitting, to the data receiving device, a representation of the neural network architectural configuration.

4. The method of claim 3, further comprising:
participating in joint training of the neural network architectural configuration for the transmitter neural network with a neural network architectural configuration for a receiver neural network of the data receiving device.

5. The method of claim 1, further comprising:
receiving, from the data receiving device, a representation of a sensor configuration identifying the first set of one or more sensors from a plurality of sensors of the data sending device; and
selectively activating the first set of one or more sensors based on the sensor configuration.

6. The method of claim 1, further comprising at least one of:
receiving, from the data receiving device, a representation of time resources or frequency resources to be utilized by a sensor of the first set of one or more sensors that operates in a licensed frequency spectrum; or
transmitting to the data receiving device a representation of time resources or frequency resources to be utilized by a sensor of the data receiving device that operates in a licensed frequency spectrum.

7. The method of claim 1, further comprising:
determining that at least one sensor of the first set of one or more sensors is unavailable;
implementing a neural network architectural configuration at the transmitter neural network of the data sending device based on sensor capabilities of the data sending device that exclude the at least one sensor that is unavailable;
receiving a second information block as an input to the transmitter neural network of the data sending device;
receiving, as an input to the transmitter neural network, a second set of sensor data from the first set of one or more sensors of the data sending device;
processing the second information block and the second set of sensor data at the transmitter neural network to generate a second output; and
controlling an RF transceiver of the data sending device based on the second output to generate a second RF signal for wireless transmission to the data receiving device.

8. The method of claim 7, wherein controlling the data sending device based on the first output comprises controlling at least one of: a scheduling decision; a handover decision for the data receiving device based on the first output; or a beam management operation of the RF transceiver based on the first output.

9. A computer-implemented method, in a data receiving device, comprising:
receiving a first output from a radio frequency transceiver of the data receiving device as a first input to a receiver neural network of the data receiving device;
receiving, as a second input to the receiver neural network, a first set of sensor data from a first set of one or more sensors of the data receiving device;
processing the first input and the second input at the receiver neural network to generate a second output; and
processing the second output at the data receiving device to generate a first information block representative of information communicated by a data sending device.

10. The method of claim 9, further comprising one of:
identifying a neural network architectural configuration to be implemented by the data receiving device based on sensor capabilities of the data receiving device and implementing the neural network architectural configuration for the receiver neural network; or
transmitting an indication of sensor capabilities of the data receiving device to the data sending device, receiving, from the data sending device, a representation of a neural network architectural configuration that is based on the sensor capabilities of the data receiving device, and implementing the neural network architectural configuration for the receiver neural network.

11. The method of claim 9, further comprising:
receiving, from the data sending device, a representation of sensor capabilities of the data sending device;
determining a neural network architectural configuration to be implemented by a transmitter neural network of the data sending device based on the sensor capabilities of the data sending device; and
transmitting, to the data sending device, a representation of the neural network architectural configuration.

12. The method of claim 11, further comprising:
participating in joint training of the neural network architectural configuration for the receiver neural network with a neural network architectural configuration for a transmitter neural network of the data sending device.

13. The method of claim 9, further comprising:
receiving, from the data sending device, a representation of a sensor configuration identifying the first set of one or more sensors from a plurality of sensors of the data receiving device; and
selectively activating the first set of one or more sensors based on the sensor configuration.

14. The method of claim 9, further comprising one of:
receiving, from the data sending device, a representation of time resources or frequency resources to be utilized by a sensor of the first set of one or more sensors that operates in a licensed frequency spectrum; or
transmitting to the data sending device a representation of time resources or frequency resources to be utilized by a sensor of the data sending device that operates in a licensed frequency spectrum.

15. The method of claim 9, further comprising:
determining that at least one sensor of the first set of one or more sensors is unavailable;
implementing a neural network architectural configuration at the receiver neural network of the data receiving device based on sensor capabilities of the data receiving device that exclude the at least one sensor that is unavailable;
receiving a second output from the RF transceiver of the data receiving device as a third input to the receiver neural network;
receiving, as a fourth input to the receiver neural network, a second set of sensor data from the first set of one or more sensors of the data receiving device;
processing the third input and the fourth input at the receiver neural network to generate a third output; and
processing the third output at the data receiving device to generate a second information block representative of information communicated by the data sending device.

16. The method of claim 1, wherein the first set of one or more sensors includes at least one of: an object-detection sensor, a positioning sensor, an image sensor, a user interface sensor, and a pose sensor.

17. The method of claim 16, wherein the user interface sensor comprises at least one of a touch sensor, an audio sensor, and a light sensor.

18. The method of claim 1, wherein:
the data sending device comprises a base station of a cellular network and the data receiving device comprises a user equipment of the cellular network; or the data sending device comprises a UE of a cellular network and the data receiving device comprises a BS of the cellular network.

19. A data receiving device comprising:

a plurality of sensors including a first set of one or more sensors;

a radio frequency transceiver;

at least one processor-coupled to the radio frequency transceiver and to the plurality of sensors; and a non-transitory computer-readable medium-storing a set of instructions, the set of instructions configured to manipulate the at least one processor to:

receive a first output from the radio frequency transceiver of the data receiving device as a first input to a receiver neural network of the data receiving device;

receive, as a second input to the receiver neural network, a first set of sensor data from the first set of one or more sensors;

process the first input and the second input at the receiver neural network to generate a second output; and process the second output at the data receiving device to generate a first information block representative of information communicated by a data sending device.

20. A data sending device comprising:

a plurality of sensors including a first set of one or more sensors;

a radio frequency transceiver;

at least one processor coupled to the radio frequency transceiver and to the plurality of sensors; and a non-transitory computer-readable medium-storing a set of instructions, the set of instructions configured to manipulate the at least one processor to:

receive a first information block as an input to a transmitter neural network of the data sending device, the first information block representing a set of information bits to be transmitted to a data receiving device;

receive, as an input to the transmitter neural network, a first set of sensor data from the first set of one or more sensors;

process the first information block and the first set of sensor data at the transmitter neural network to generate a first output; and control the data sending device based on the first output to generate a first radio frequency signal for wireless transmission to the data receiving device.

\* \* \* \* \*